United States Patent
Tomosada et al.

(10) Patent No.: US 10,638,033 B2
(45) Date of Patent: Apr. 28, 2020

(54) FOCUS CONTROL APPARATUS, FOCUS CONTROL METHOD AND STORAGE MEDIUM

(71) Applicant: CANON KABUSHIKI KAISHA, Tokyo (JP)

(72) Inventors: Toshihiko Tomosada, Kawasaki (JP); Tatsuya Wada, Yokohama (JP); Hideyasu Hongu, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/051,564

(22) Filed: Aug. 1, 2018

(65) Prior Publication Data
US 2019/0045133 A1  Feb. 7, 2019

(30) Foreign Application Priority Data
Aug. 3, 2017 (JP) .................... 2017-151034

(51) Int. Cl.
*H04N 5/232* (2006.01)
*H04N 9/07* (2006.01)

(52) U.S. Cl.
CPC ... *H04N 5/232122* (2018.08); *H04N 5/23219* (2013.01); *H04N 5/232123* (2018.08); *H04N 5/232125* (2018.08); *H04N 9/07* (2013.01)

(58) Field of Classification Search
CPC ............ H04N 5/232122; H04N 9/07; H04N 5/23219; H04N 5/232125; H04N 5/232123
See application file for complete search history.

(56) References Cited

U.S. PATENT DOCUMENTS

2015/0181106 A1* 6/2015 Komori ............. H04N 5/23212
348/349

FOREIGN PATENT DOCUMENTS

JP  63-017418 A  1/1988
JP  2010-102041 A  5/2010

* cited by examiner

*Primary Examiner* — Ahmed A Berhan
(74) *Attorney, Agent, or Firm* — Cowan, Liebowitz & Latman, P.C.

(57) ABSTRACT

In a focus control apparatus, an acquisition unit periodically acquires a pair of focus detection signals, a focus detection unit detects a focus state of a first area using a phase difference and, in a case where the focus state of the first area is not within a first range, detects a focus state using a phase difference in a second area arranged in a periphery of the first area, and a control unit controls to perform focus control. The focus control is performed based on the focus state of the second area if it is within a second range and, if a subject exists on a near side, focus control is performed based on the focus state of the first area regardless of the focus state of the second area being detected or not.

18 Claims, 19 Drawing Sheets

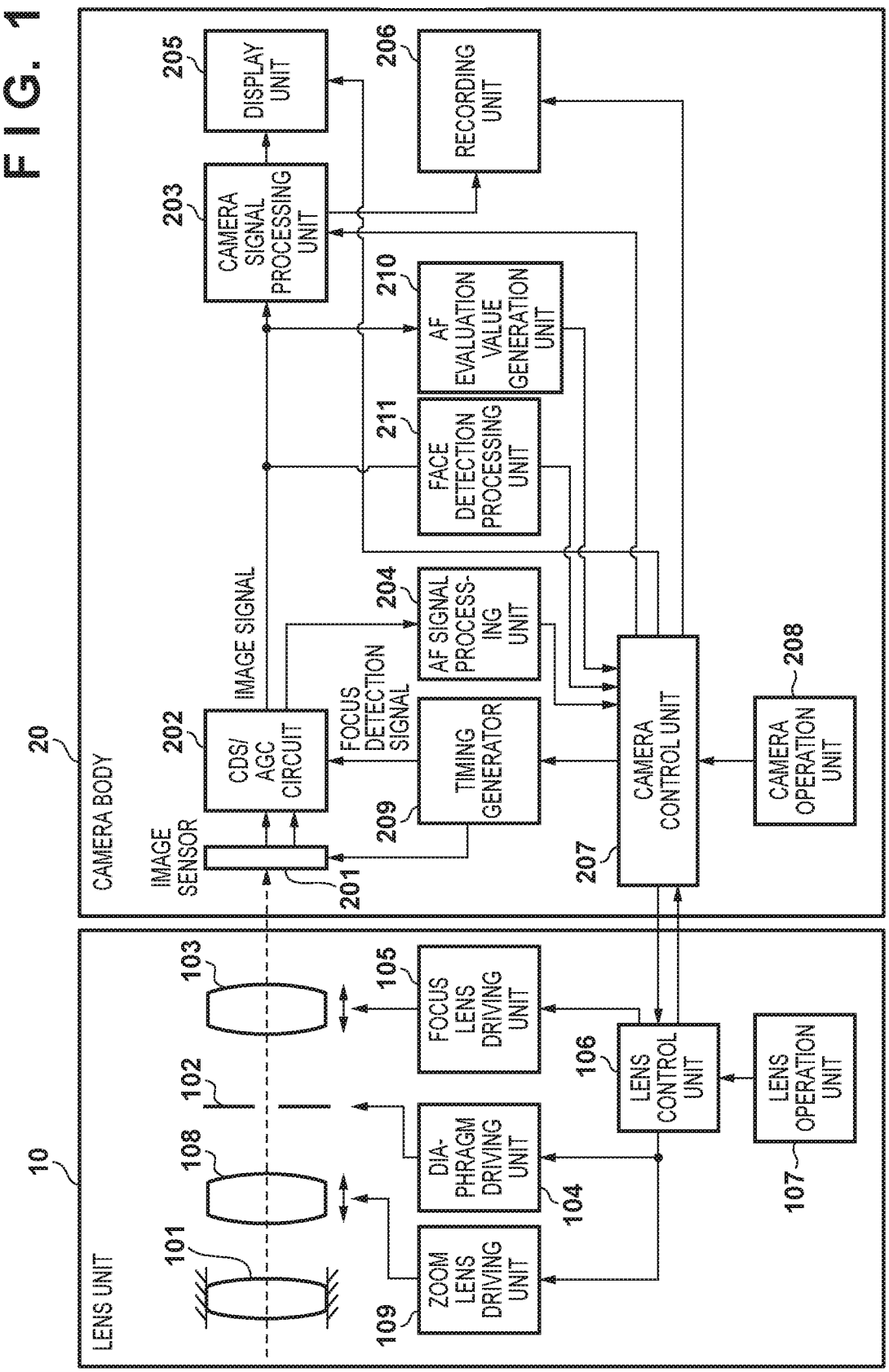

| R | Gr | R | Gr | R | Gr | R | Gr | R | Gr |
|---|----|---|----|---|----|---|----|---|----|
| Gb | B | Gb | B | Gb | B | Gb | B | Gb | B |

| R A | R B | Gr A | Gr B | R A | R B | Gr A | Gr B | R A | R B | Gr A | Gr B | R A | R B | Gr A | Gr B | R A | R B | Gr A | Gr B |
|---|---|---|---|---|---|---|---|---|---|---|---|---|---|---|---|---|---|---|---|
| Gb A | Gb B | B A | B B | Gb A | Gb B | B A | B B | Gb A | Gb B | B A | B B | Gb A | Gb B | B A | B B | Gb A | Gb B | B A | B B |

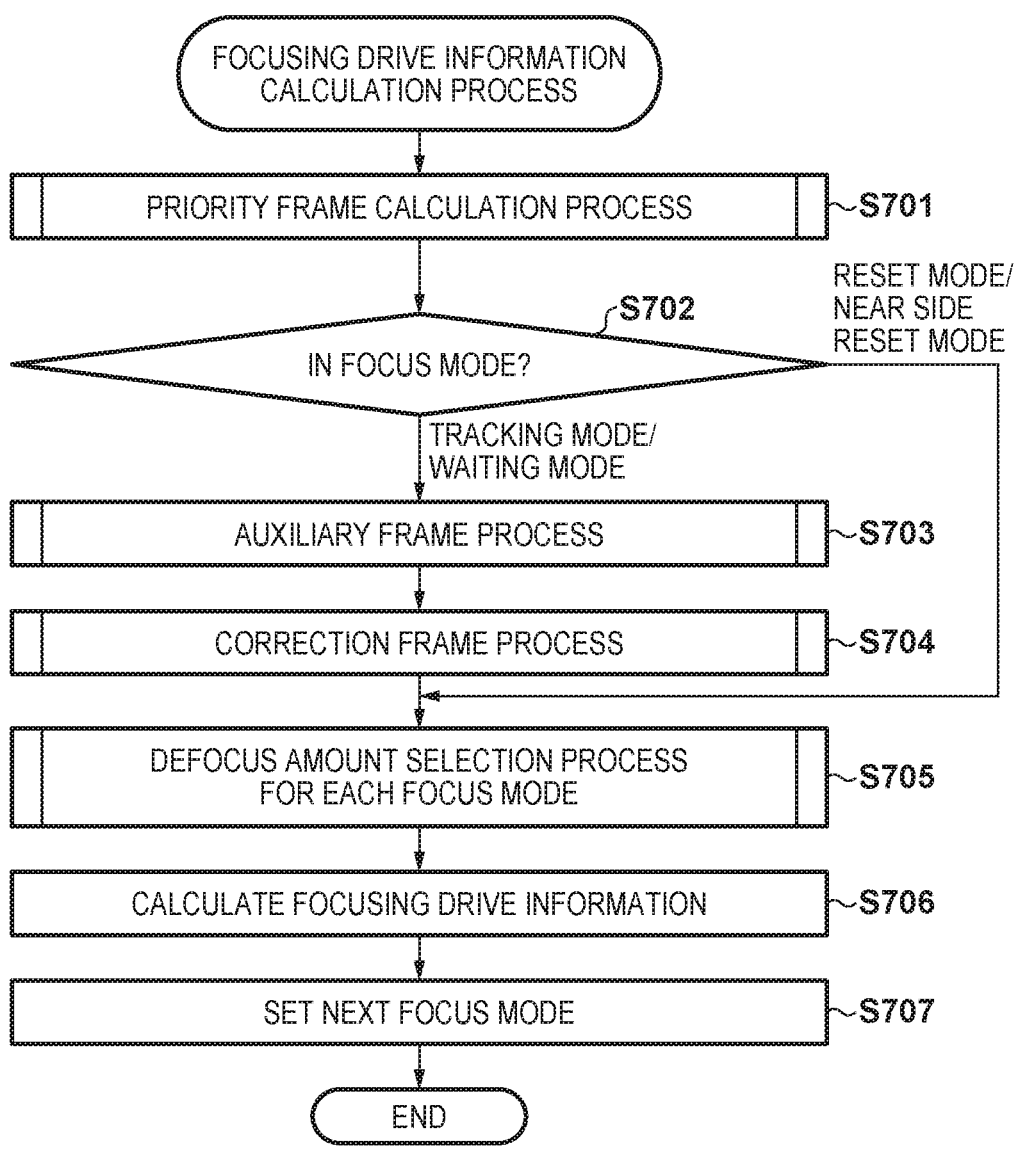

FOCUS CONTROL APPARATUS, FOCUS CONTROL METHOD AND STORAGE MEDIUM

BACKGROUND OF THE INVENTION

Field of the Invention

The present invention relates to a focus control apparatus, focus control method and storage medium and, more specifically to, a focus control apparatus, focus control method and storage medium that performs focus detection using on-imaging plane phase difference detection method.

Description of the Related Art

Conventionally, as an automatic focus control (AF) method, there is an on-imaging plane phase difference detection method (on-imaging plane phase difference AF) in which focus control of the phase difference detection method is performed based on signals obtained from an image sensor. In the on-imaging plane phase difference AF, a defocus amount is calculated from a phase difference between a pair of image signals obtained by receiving light beam passing through mutually different exit pupil regions of an imaging optical system. Then, the in-focus state is obtained by moving a focus lens by a moving amount corresponding to the defocus amount.

In the focus adjustment, it is also important to set an area (AF frame) for acquiring signals used for focus detection as well as the method of specifying the in-focus position. When shooting a moving image, since a main subject is often placed at a screen center, it is common to take a method in which the AF frame is set at the center of an image sensor screen, and the focus control is executed by driving a focus lens on the basis of the focus detection result in the AF frame. However, in order to maintain the in-focus state of the subject in various photographic compositions, under a situation in which the subject moves, camera shake occurs by the photographer, and so forth, it is necessary to set the AF frame over a wide range of the screen.

Further, in order to set a wider AF frame when performing the on-imaging plane phase difference AF, it is necessary to set a larger number of focus detection areas (distance measuring points). Furthermore, there is a need for a method of selecting or calculating a defocus amount to be used for calculating a moving amount (focus driving amount) of the focus lens to attain the in-focus state from data obtained from the focus detection areas.

In the on-imaging plane phase difference AF during still image shooting, as a method for maintaining the in-focus state of the main object, there is a focus priority method in which a focus detection area indicating a defocus amount closest to the in-focus state is selected from the plurality of focus detection areas. In this focus priority method, there is proposed a technique for improving the followability of a subject by setting a wider AF frame when a main subject cannot be detected in a preset AF frame (see Japanese Patent Laid-Open No. S63-17418).

Also, in addition to setting the AF frame at an arbitrary position designated by the user, there is a frame setting method in which a camera, provided with a face detection function, for example, automatically sets the AF frame. Further, a technique that allows the AF frame to be set to a shape and position different from those of a normal AF frame according to the state of face detection has been proposed (Japanese Patent Laid-Open No. 2010-102041).

According to the method of Japanese Patent Laid-open No. S63-17418, in a case where a subject in focus cannot be detected, by setting a wider AF frame, it is possible to maintain the subject in focus in a wide range of the imaging screen. However, in a scene in which a main subject intended by a photographer is switched during moving image shooting, it is necessary to switch the in-focus position from the main subject in focus to a new main subject. In the focus priority method, since the in-focus state of the current main subject is maintained as long as the defocus amount closest to the in-focus state is obtained, the focus followability with respect to the main subject increases by setting a wider AF frame. However, there is a problem in which, if the main subject is switched to another subject, it is difficult to change the in-focus positions. An example in which this problem remarkably appears is a scene which is focused on the background. Since the background often occupies most of a captured image, even if a new main subject appears, as long as the background is included in the wide AF area, the in-focus position does not switch to focus on the main subject.

Further, according to the method of Japanese Patent Laid-Open No. 2010-102041, the size of the AF frame is changed according to the state of face detection. This technique is effective in a case where an AF frame at the time of a face being not detected is larger than a face detection AF frame at the time of a face being detected, but it is not effective for an AF method, such as the center-weighted AF method, which sets an AF frame at a specific part. For example, in a case of switching to the center-weighted AF method due to temporary failure of face detection from a state in which the main subject is located in a position other than the center of the screen due to face detection or the like, there may be a case where a different subject located in the center is caught.

Further, a manual focus operation also has the similar problem. For example, during the center-weighted AF being effective, if the user temporarily manually focuses on a subject in a region other than the center by manual focus operation and ends the operation, the center-weighted AF method is restored and a different subject located in the center may be focused.

SUMMARY OF THE INVENTION

The present invention has been made in consideration of the above situation, and more stably maintains an in-focus state of a main subject and prevents focus from fixing on background due to focus detection by an on-imaging plane phase difference detection method.

According to the present invention, provided is a focus control apparatus comprising: an acquisition unit that periodically acquires image signals from an image sensor so as to be able to obtain a pair of focus detection signals having parallax; a focus detection unit that detects a focus state of a predetermined first area using a phase difference between the pair of focus detection signals and, in a case where the focus state of the first area is not within a predetermined first range, detects a focus state using a phase difference between the pair of focus detection signals obtained from a second area arranged in a periphery of the first area; and a control unit that controls to perform focus control based on the focus state detected by the focus detection unit, wherein the control unit controls so as to perform the focus control based on the focus state of the second area in a case where the focus state of the second area is within a predetermined second range and, in a case where it is determined that a subject exists on a near side based on the focus state of the first area by the focus detection unit, controls so as to perform focus control based on the focus state of the first area regardless of the focus state of the second area being detected or not.

Further, according to the present invention, provided is a focus control method comprising: periodically acquiring image signals from an image sensor so as to be able to obtain a pair of focus detection signals having parallax; detecting a focus state of a predetermined first area using a phase difference between the pair of focus detection signals; in a case where the focus state of the first area is not within a predetermined first range, detecting a focus state using a phase difference between the pair of focus detection signals obtained from a second area arranged in a periphery of the first area; controlling to perform focus control based on the focus state of the second area in a case where the focus state of the second area is within a predetermined second range; and in a case where it is determined that a subject exists on a near side based on the focus state of the first area, controlling to perform focus control based on the focus state of the first area regardless of the focus state of the second area being detected or not.

Furthermore, according to the present invention, provided is a non-transitory storage medium readable by a computer, the storage medium storing a program that is executable by the data processing apparatus, wherein the program includes program code for causing the data processing apparatus to perform as a focus control apparatus comprising: an acquisition unit that periodically acquires image signals from an image sensor so as to be able to obtain a pair of focus detection signals having parallax; a focus detection unit that detects a focus state of a predetermined first area using a phase difference between the pair of focus detection signals and, in a case where the focus state of the first area is not within a predetermined first range, detects a focus state using a phase difference between the pair of focus detection signals obtained from a second area arranged in a periphery of the first area; and a control unit that controls to perform focus control based on the focus state detected by the focus detection unit, wherein the control unit controls so as to perform the focus control based on the focus state of the second area in a case where the focus state of the second area is within a predetermined second range and, in a case where it is determined that a subject exists on a near side based on the focus state of the first area by the focus detection unit, controls so as to perform focus control based on the focus state of the first area regardless of the focus state of the second area being detected or not.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 1 is a block diagram showing a schematic configuration of a camera system according to an embodiment of the present invention;

FIG. 7 is a flowchart showing a focusing drive information calculation process according to the embodiment;

DESCRIPTION OF THE EMBODIMENTS

Figures 2A, 2B, 3:
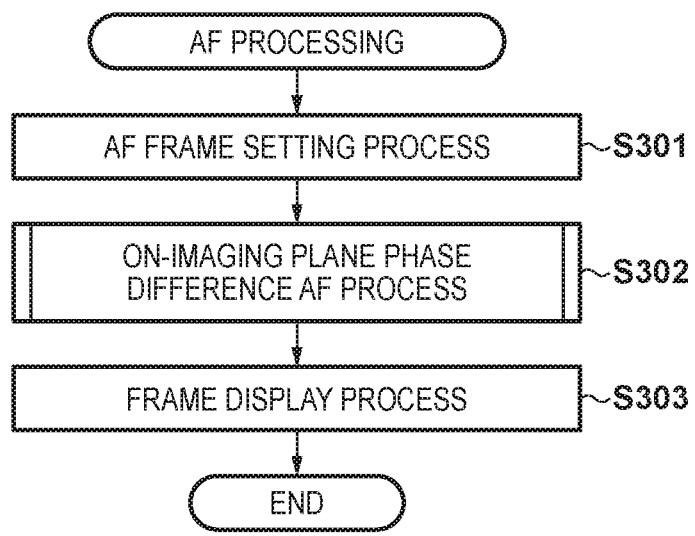
FIGS. 2A and 2B are diagrams showing a configuration example of a part of pixels of an image sensor according to the embodiment.
FIG. 3 is a flowchart showing AF processing according to the embodiment.

Exemplary embodiments of the present invention will be described in detail in accordance with the accompanying drawings. The dimensions, shapes and relative positions of the constituent parts shown in the embodiments should be changed as convenient depending on various conditions and on the structure of the apparatus adapted to the invention, and the invention is not limited to the embodiments described herein.

First Embodiment

First, a first embodiment of the present invention will be described in detail. In the following embodiments, a digital video camera system will be described as an example of an image capturing apparatus having a focus control apparatus according to the present invention, but the present invention is not limited to this. In addition, in the following embodiments, a subject to be focused is referred to as a "main subject", and a subject other than a main subject such as a background is referred to as a "miscellaneous subject".

FIG. 1 is a block diagram showing a configuration of a lens interchangeable camera system including a lens unit and a camera body according to an embodiment of the present invention. As shown in FIG. 1, the camera system according to the present embodiment includes a lens unit 10 and a camera body 20, and a lens control unit 106 that integrally controls operations of the entire lens unit 10 communicates data with a camera control unit 207 that integrally controls operations of the entire camera. In the present embodiment, the camera control unit 207 includes a processor such as a CPU, an MPU, and so forth, and a storage unit such as a memory. It should be noted that an arithmetic circuit may be provided in the camera control unit 207, and some arithmetic functions performed by the processor may be executed by the arithmetic circuit. In the present embodiment, an interchangeable lens type camera will be described as an example, but the present invention is also applicable to a camera integrated with a lens.

First, the configuration of the lens unit 10 will be described. The lens unit 10 has an imaging optical system including a fixed lens 101, a zoom lens 108, a diaphragm 102, and a focus lens 103. The diaphragm 102 is driven by a diaphragm driving unit 104 and controls the amount of light incident on an image sensor 201 described later. The focus lens 103 is driven by a focus lens driving unit 105 and performs focus control. The zoom lens 108 adjusts the zoom by being driven by a zoom lens driving unit 109. A lens unit 10 having no zoom function may also be used.

The diaphragm driving unit 104, the focus lens driving unit 105 and the zoom lens driving unit 109 are controlled by the lens control unit 106, and the aperture of the diaphragm 102, the positions of the focus lens 103 and the zoom lens 108 are determined. When an operation for the diaphragm, focus, zoom, etc. is performed by the user via a lens operation unit 107, the lens control unit 106 performs control according to the user's operation. Further, the lens control unit 106 controls the diaphragm driving unit 104, the focus lens driving unit 105, and the zoom lens driving unit 109 according to control commands and control information, described later, received from the camera control unit 207. Further, the lens control unit 106 transmits lens information (for example, information on the imaging optical system) to the camera control unit 207.

Next, the configuration of the camera body 20 having an automatic focus control function according to the present embodiment will be described. The camera body 20 is configured so as to be able to acquire an imaging signal from a light flux that has passed through the imaging optical system of the lens unit 10. The image sensor 201 is configured using a CCD or a CMOS sensor. The light flux having passed through the imaging optical system forms an image on the light receiving surface of the image sensor 201, and the formed object image is converted (photoelectrically converted) into charges by photodiodes corresponding to the amounts of incident light. The charges accumulated in the respective photodiodes are sequentially read out from the image sensor 201 as a voltage signal corresponding to the charges based on a drive pulse supplied from the timing generator 209 in accordance with a command from the camera control unit 207.

FIGS. 2A and 2B show an example of a configuration of pixels in a part of the light receiving surface of the image sensor 201. In FIGS. 2A and 2B, Gr or Gb indicates a pixel having spectral sensitivity in green, R indicates a pixel having spectral sensitivity in red, and B indicates a pixel having spectral sensitivity in blue. In the case of an image sensor that is not corresponding to the on-imaging plane phase difference AF, for example, the pixel configuration is as shown in FIG. 2A having the Bayer arrangement. On the other hand, in the image sensor 201 of this embodiment, in order to perform the on-imaging plane phase difference AF, each pixel includes a plurality of (two in the present embodiment) photodiodes as shown in FIG. 2B. With this configuration, a light flux incoming through the lens unit 10 is separated by a microlens (not shown) provided for each pixel and imaged on each of the two photodiodes (photodiodes A and B), thereby two kinds of signals for imaging and AF can be acquired. That is, the signal (image signal A+B) obtained by adding the signals from the two photodiodes is the imaging signal and the signals (image signal A, image signal B) from the individual photodiodes are two image signals for AF (focus detection signals). Since the respective photodiodes receive light fluxes that have passed through different regions of the exit pupil of the imaging optical system, the image signal B has parallax with respect to the image signal A.

The method of acquiring the two image signals is not limited to the method of independently reading out each of the two image signals. For example, taking the processing load into consideration, an imaging signal (image signal A+B) obtained by adding signals from two photodiodes and a signal (for example, image signal A) of one photodiode are read out, and the other image signal (For example, the image signal B) is obtained from the difference between the read-out two signals. In addition, a total of three kinds of signals of the imaging signal (image signal A+B) and two signals for AF (image signal A, image signal B) may be respectively read out.

Then, correlation calculation is performed on the two image signals for AF (focus detection signals) in an AF signal processing unit 204, which will be described later, and focus detection of the phase difference detection method is performed, whereby an image shift amount and various reliability information can be calculated.

In this embodiment, one pixel has two photodiodes, but the number of photodiodes is not limited to two and may be more than two. Further, the configuration of the image sensor 201 corresponding to the on-imaging plane phase difference AF is not limited to a configuration in which a plurality of photodiodes are provided for one pixel as described above, and pixels for focus detection (for example, pairs of pixels in which different light receiving regions are shielded from each other) may be discretely provided.

The imaging signal and the focus detection signals read from the image sensor 201 are input to a CDS/AGC circuit 202, and undergo correlated double sampling for reducing reset noise, gain adjustment, and signal digitization. The CDS/AGC circuit 202 outputs the imaging signal to a camera signal processing unit 203, an AF evaluation value generation unit 210, and a face detection processing unit 211, and outputs the focus detection signals to the AF signal processing unit 204.

The camera signal processing unit 203 transmits the imaging signal output from the CDS/AGC circuit 202 to a display unit 205. The display unit 205 is a display device (display member) configured using an LCD, an organic EL, or the like, and displays an image based on the imaging signal. Also, in the mode of recording the imaging signal, the imaging signal is recorded on a recording unit 206.

The AF signal processing unit 204 performs a correlation calculation based on the focus detection signals output from the CDS/AGC circuit 202, and calculates an image shift amount and information on reliability. As the information on reliability, two image coincidence degrees, two image sharpness degrees, contrast information, saturation information, scratch information and the like can be used. Then, the calculated image shift amount and reliability information are output to the camera control unit 207.

The AF evaluation value generation unit 210 extracts a high frequency component from the imaging signal, generates an AF evaluation value to be used for focus detection of a known contrast detection method, and outputs the AF evaluation value to the camera control unit 207. The AF evaluation value represents the sharpness (contrast state) of the image generated based on the output signal from the image sensor 201. Since the sharpness varies depending on the focus state (degree of focus) of the imaging optical system, it consequently is a signal that represents the focus state of the imaging optical system. An area on the image sensor 201 used for generating the AF evaluation value includes an area corresponding to the area used for generating the image signals for phase difference detection in the present embodiment, but may be set in a different area.

The face detection processing unit 211 is a circuit that performs known face recognition processing on the imaging signal output from the CDS/AGC circuit 202 and detects a face area of a person in an imaging screen, and outputs the detection result to the camera control unit 207. Based on the detection result, the camera control unit 207 sets an area used for focus detection in the imaging screen. As the face recognition processing, various methods are known. The methods include, for example, a method of extracting a complexion color region from the tone color of each pixel represented by image data and detecting a face based on a degree of matching with a contour plate of a face prepared in advance, a method of performing pattern recognition based on detected feature points of faces such as eyes, nose, mouth, and the like.

The camera control unit 207 exchanges information with each configuration in the camera body 20 and performs control. The camera control unit 207 not only executes the processing in the camera body 20 but also executes camera functions operated by the user, such as changing the ON/OFF state of the power supply, changing the setting, starting the recording, starting the focus control, confirming a recorded image, and so forth, in accordance with the input from a camera operation unit 208. Further, as described above, the camera control unit 207 exchanges information with the lens control unit 106 in the lens unit 10, sends control commands and control information of the imaging optical system, and acquires information in the lens unit 10.

Next, the entire sequence of AF processing executed by the camera control unit 207 will be described with reference to FIG. 3. The processes of steps S301 to S303 described below are periodically executed based on the operation cycle of the camera.

In step S301, the camera control unit 207 performs an AF frame setting process in response to a user operation. The setting process of the AF frame is a process for setting an AF frame for acquiring a signal used for the on-imaging plane phase difference AF.

Figure 4A:
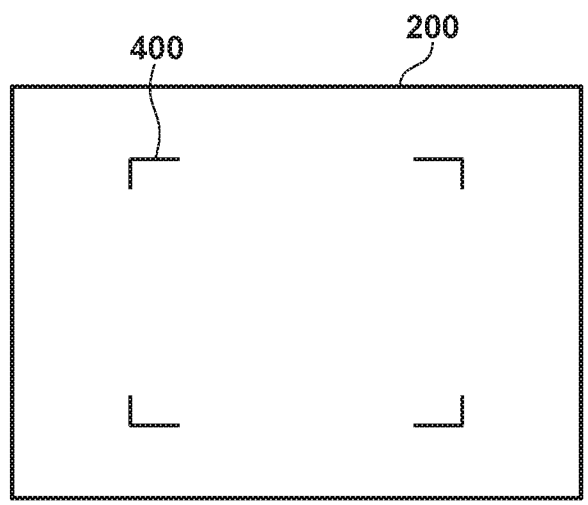
FIGS. 4A and 4B are diagrams showing an example of an AF frame according to the embodiment.
Figure 4B:
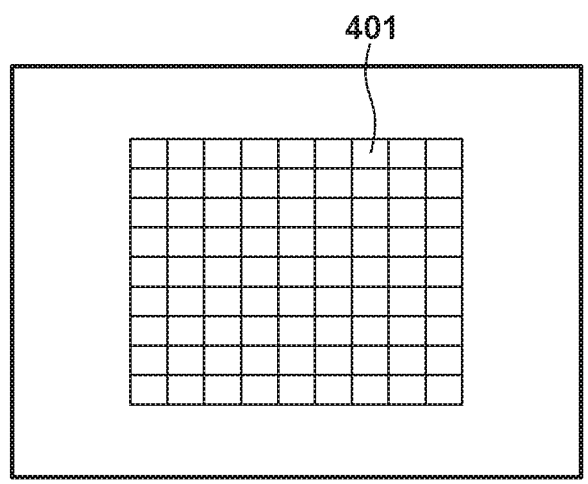

FIGS. 4A and 4B are diagrams showing an example of the AF frame set in step S301. In FIG. 4A, an AF frame 400 is arranged in a pixel area 200 on the image sensor 201. The AF frame 400 is a display frame indicating a range in which focus detection is performed, and is a frame that can be checked by a user on a monitor such as the display unit 205. However, as shown in FIG. 4B, the focus detection areas 401 (distance measuring points) divided into N×M areas (9×9 in the example shown in FIG. 4B) are actually arranged in the AF frame 400 so as not to be visible to the user.

Next, in step S302, the camera control unit 207 performs an on-imaging plane phase difference AF process. The on-imaging plane phase difference AF process includes a process of performing focus detection by the on-imaging plane difference method with respect to the AF frame, and a process of calculating a driving amount and direction (focusing drive information) to drive the focus lens 103 to an in-focus position based on the focus detection result, and performing focus driving. Details of the on-imaging plane phase difference AF process will be described later with reference to FIGS. 5 to 12B.

In step S303, the camera control unit 207 performs a display process of the AF frame. This process is performed so as to facilitate framing of the subject to be photographed by visually displaying the AF frame designated by the user on the monitor such as the display unit 205 and explicitly indicating to the user the area where the focus detection is to be performed. In the present embodiment, a plurality of focus detection areas obtained by dividing the range of the AF frame, designated by the user, into rectangular areas are internally set, however the display unit 205 displays the AF frame designated by the user and does not display the plurality of focus detection areas that are internally set. When the process of displaying the AF frame is completed, the AF processing ends.

Figure 5:
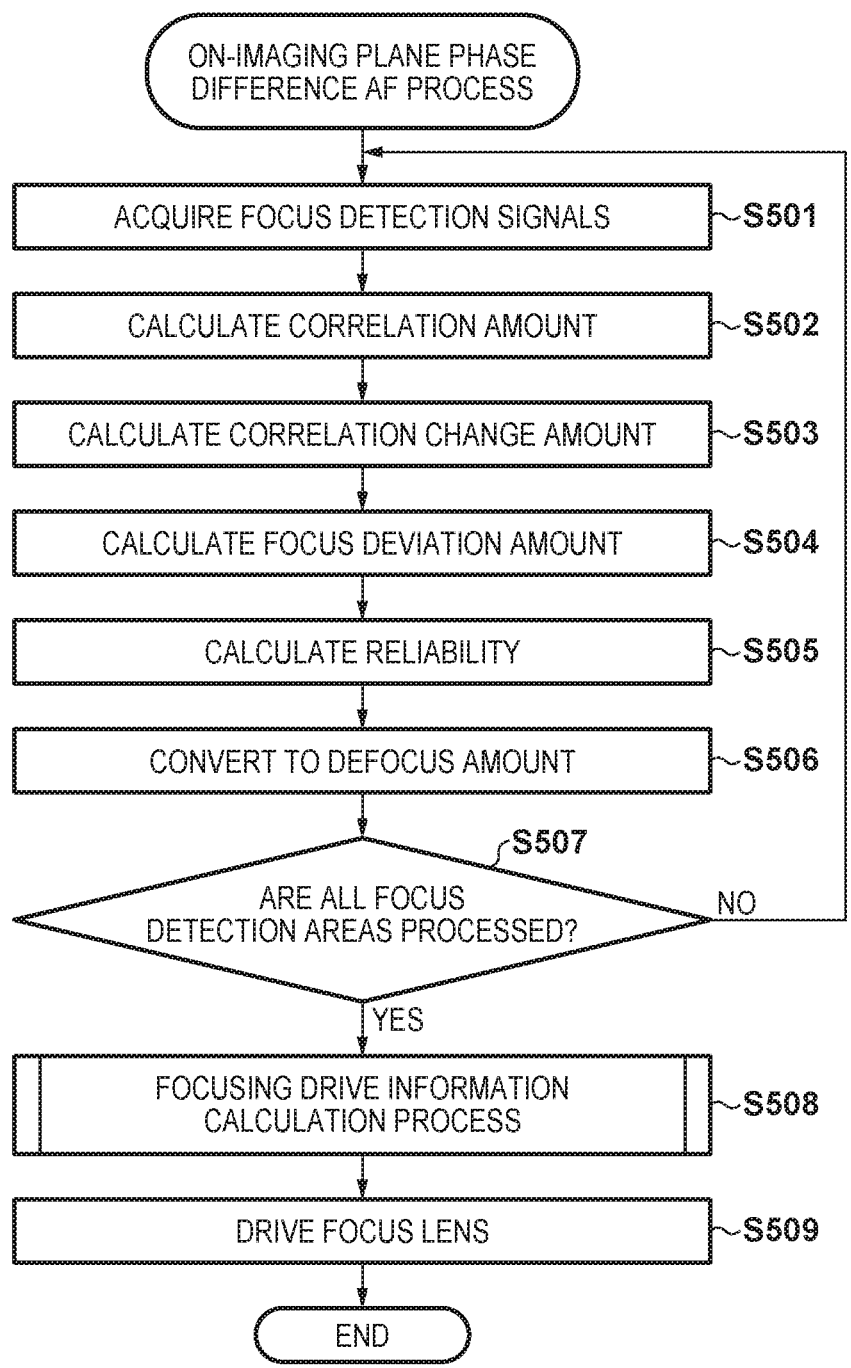
FIG. 5 is a flowchart showing an on-imaging plane phase difference AF process according to the embodiment.

Next, the on-imaging plane phase difference AF process performed in step S302 of FIG. 3 will be described with reference to a flowchart of FIG. 5.

First, in step S501, focus detection signals are acquired from one focus detection area 401 among the plurality of focus detection areas 401 arranged in the AF frame 400 set in step S301. In step S502, the focus detection signals acquired in step S501 are shifted relative to each other, and the correlation amount is calculated at each shift position. In step S503, a correlation change amount indicating the change amount of the correlation amount calculated in step S502 with respect to the unit shift amount is calculated. In step S504, a focus deviation amount indicating a shift amount to the shift position at which the correlation change amount calculated in step S503 is minimum is calculated. In step S505, a reliability indicating how much the focus deviation amount calculated in step S504 is reliable is calculated. As described above, the reliability is a value calculated based on the degree of coincidence of two images of image signals, the steepness of two images and the like. In step S506, the focus deviation amount calculated in step S504 is converted into the defocus amount of the focus lens.

In step S507, it is determined whether the processes in steps S501 to S506 have been performed for all the focus detection areas 401 set in step S301. When processes have not been performed for all the focus detection areas 401, the process returns to step S501 and the processes from steps S501 to S506 are repeated for the unprocessed focus detection area 401. On the other hand, if processes have been performed for all the focus detection areas 401, the process proceeds to step S508.

In step S508, focusing drive information is calculated based on the defocus amount calculated for each of the focus detection areas 401 set in step S301. Details of the focusing drive information calculation process will be described later with reference to FIGS. 6 to 12B.

In step S509, the focus lens 103 is driven using the focusing drive information calculated in step S508, and the process ends.

Next, the focusing drive information calculation process performed in step S508 will be described in detail with reference to FIGS. 6 to 12B. In the present embodiment, there are four types of control states of focus (hereinafter referred to as "focus mode"): "reset mode". "near side reset mode", "waiting mode", and "tracking mode". These modes differ from each other in a method of setting the focus detection areas used in calculation of the focusing drive information and in a method of selecting a defocus amount to be ultimately used for the focus driving among the defocus amounts calculated for the plurality of focus detection areas.

Figure 12A:
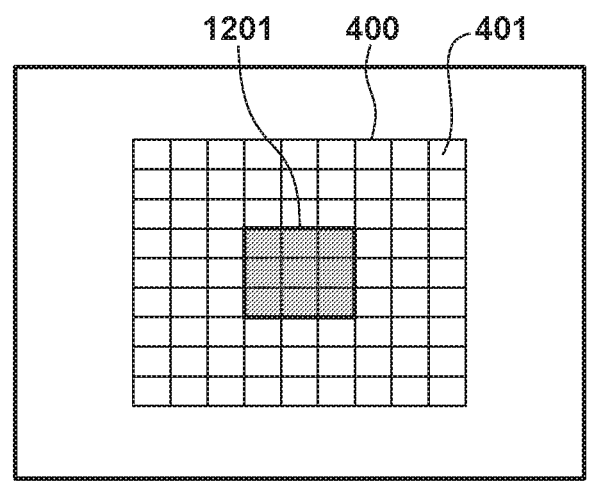
FIGS. 12A and 12B are conceptual diagrams relating to the setting of a priority frame, an auxiliary frame, and a correction frame according to the embodiment.

The reset mode is a mode performed in the initial state or when the main subject changes and the focus lens 103 is driven to a relatively large degree. In the reset mode, from the defocus amounts of the 3×3 focus detection areas 401 located in a priority frame 1201 set as shown in FIG. 12A inside the AF frame 400, a defocus amount greatly deviated from the standard deviation is excluded. Then, using the average value of the rest of the defocus amounts, the focus lens 103 is driven. In this manner, it is possible to stably focus on a subject occupying a large area among subjects contained in the 3×3 focus detection area 401 located in the priority frame 1201. As the priority frame 1201, when a face area of a person is selected by the face detection processing unit 211, the face area can be set as the priority frame 1201. Further, not limited to the face area, it is also possible to detect an arbitrary subject and set the priority frame 1201 in the subject area, or set the priority frame 1201 in a region of a main subject in the previous focus detection processing or in a predetermined area (for example, a central portion of the AF frame 400, and so on) or the like.

Figure 12B:
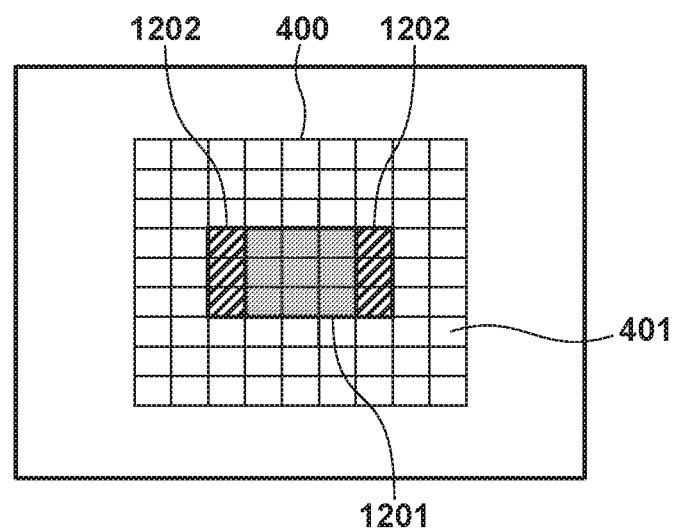

The tracking mode is a mode in which the focus lens 103 is driven relatively small in order to follow the main subject in the vicinity of focus. In the tracking mode, the defocus amounts of the focus detection areas 401 in the priority frame 1201 set inside the AF frame 400 and in an auxiliary frame 1202 arranged in the periphery of the priority frame 1201 shown in FIG. 12B are used. Then, using the defocus amount/amounts in the vicinity of the defocus amount indicating the current in-focus state out of the defocus amounts of the focus detection areas 401 in the priority frame 1201 and the auxiliary frame 1202, the focus lens 103 is driven so as to maintain the in-focus state of the main subject. Further, among the focus detection areas 401 in the priority flame 1201 and the auxiliary frame 1202, if the number of the focus detection areas 401 which are likely to be used for calculating the focusing drive information (for example, the reliable focus deviation amounts were detected) is small, the following control is made. First, from the AF frame 400, the focus detection area/areas 401 in which the defocus amount/amounts near the defocus amount indicating the current in-focus state has/have been calculated is/are extracted. Then, by using the extracted defocus amount/amounts of the focus detection area/areas 401 for calculation of the focusing drive information, the accuracy of the focusing drive information to be calculated is improved. In the tracking mode, by calculating focusing drive information using the defocus amounts of the focus detection areas 401 not only in the priority frame 1201 but also in the auxiliary frame 1202 and further in the AF frame 400, it is possible to maintain the in-focus state of the main subject within a substantially wide area of the screen. At this time, if it is detected from the defocus amounts in the priority frame 1201 that there is a subject located at a shorter distance than the main subject, the mode changes to the near side reset mode.

The waiting mode is a mode transitioned from the tracking mode when the main subject followed in the tracking mode is temporarily not detected in the focus detection areas 401 located in the priority frame 1201 and the auxiliary frame 1202. In the waiting mode, similarly to the tracking mode, using the defocus amount/amounts in the vicinity of the defocus amount indicating the current in-focus state out of the defocus amounts of the focus detection areas 401 in the priority frame 1201 and the auxiliary frame 1202 set in the AF frame 400, the focus lens 103 is driven so as to maintain the in-focus state of the main subject. Further, among the focus detection areas 401 in the priority frame 1201 and the auxiliary frame 1202, if the number of the focus detection areas 401 which are likely to be used for calculating the focusing drive information (for example, the reliable focus deviation amounts were detected) is small, the following control is made. First, from the AF frame 400, the focus detection area/areas 401 in which the defocus amount/amounts near the defocus amount indicating the current in-focus state has/have been calculated is/are extracted. Then, by using the extracted defocus amount/amounts of the focus detection area/areas 401 for calculation of the focusing drive information, the accuracy of the focusing drive information to be calculated is improved. If the main subject is detected within a certain period of time, the mode transits to the tracking mode, and if the waiting mode continues for more than the certain time without the main subject being detected, it is judged that the main subject is out of the screen and the mode transits to the reset mode. At this time, if it is detected from the defocus amounts in the priority frame 1201 that there is a subject located at a shorter distance than the main subject, the mode changes to the near side reset mode.

The near side reset mode is a feature of the present embodiment and is a mode that transits from the tracking mode or the waiting mode in a case where it is determined that the main subject detected in the priority frame 1201 is located at a shorter distance than the current in-focus position. In the present embodiment, whether or not there is a subject at a shorter distance than the current in-focus position is determined by determining whether or not the number of the focus detection areas 401 indicating the defocus amounts representing a shorter distance than the in-focus position among the defocus amounts of the 3×3 focus detection areas 401 in the priority frame 1201 is larger than a predetermined number. If it is determined that there is a subject at a shorter distance than the in-focus position, in the near side reset mode, the defocus amounts in the auxiliary frame 1202 are not used, and only the defocus amounts in the priority frame 1201 are used to calculate the focusing drive information. By narrowing the range for calculating the focusing drive information in this manner, even if a miscellaneous subject such as the background is focused and once the mode transits to the tracking mode, by capturing the main subject in the priority frame 1201, it is possible to focus on the main subject. This makes it possible to prevent the problem of keeping focus on the background, for example. As another method of determining whether or not there is a subject at a shorter distance than the in-focus position, in the case where focus control is performed using the defocus amount in the auxiliary frame 1202, the method of determination may be made as follows. That is, the defocus amount in the priority frame 1201 is compared with the defocus amount in the auxiliary frame 1202, and it is judged whether or not the defocus amount in the priority frame 1201 indicates a shorter distance.

Further, in the above description with reference to FIGS. 12A and 12B, the priority frame 1201 is set at the center of the screen and the auxiliary frame 1202 is set at the position adjacent to the priority frame 1201, however, the present invention is not limited to this. In addition, the size of the priority frame 1201 is explained as being larger than the auxiliary frame 1202, however, the size of the priority frame 1201 may be the same as or smaller than the size of the auxiliary frame 1202.

Figure 6:
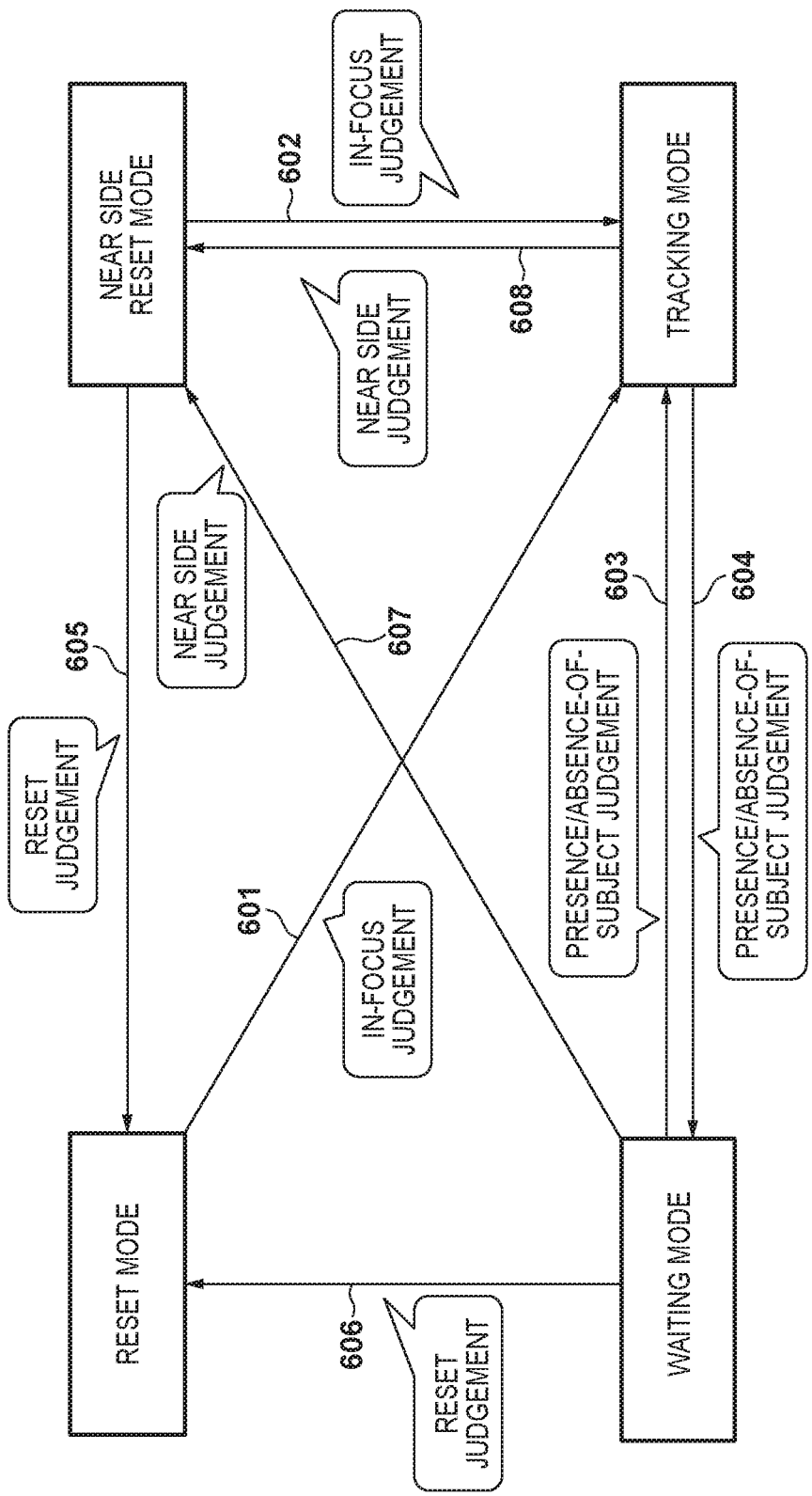
FIG. 6 is a focus mode transition diagram according to the embodiment.

Next, the transition between the focus modes will be described with reference to the focus mode transition diagram of FIG. 6. Reference numerals 601 and 602 denote transitions from the reset mode or the near side reset mode to the tracking mode. In this case, transition is made when it is determined that the defocus amount of the priority frame 1201 calculated in the course of focusing drive information calculation process falls within a range of predetermined depth of focus with respect to a value indicating the in-focus state. Note that the predetermined depth of focus used here may be a fixed value, or may be dynamically changed according to the focal length, the object distance, and the state of the diaphragm.

Reference numerals 603 and 604 denote transitions between the tracking mode and the waiting mode. Here, based on the defocus amounts in the focus detection area 401 of the priority frame 1201 and the auxiliary frame 1202, it is determined whether or not the main subject is in the area of the priority frame 1201 and the auxiliary frame 1202. Then, if it is judged that there is a main subject in the waiting mode, the mode transits to the tracking mode as shown by the transition 603, and if it is judged that there is no main subject in the tracking mode, the mode transits to the waiting mode as shown by the transition 604.

Reference numerals 605 and 606 denote transitions from the near side reset mode and the waiting mode to the reset mode. Here, based on the defocus amounts of the focus detection areas 401 in the priority frame 1201 and the auxiliary frame 1202, it is judged whether or not a state in which the main subject does not exist within the area of the priority frame 1201 and the auxiliary frame 1202 continues for a predetermined period or more, and if it is judged that that the main object does not exist for the predetermined period or more, the transition is made. As the predetermined period, by taking a case where the main subject enters and leaves the area of the priority frame 1201 and auxiliary frame 1202 and a case where the main subject returns immediately after it exits from the area due to influence of camera shake or the like into consideration, it is desirable to set a period such that transitions to the reset mode do not frequently occur.

Reference numerals 607 and 608 denote transitions from the waiting mode and the tracking mode to the near side reset mode, and transitions are made when it is judged that the subject captured in the area of the priority frame 1201 is at a shorter distance than the current in-focus position.

Next, with reference to the flowchart of FIG. 7, the flow of the focusing drive information calculation process will be described in detail. It is to be noted that the processes of steps S701 to S707 described below are periodically executed in the camera control unit 207 based on the operation cycle of the camera.

In step S701, a priority frame calculation process is performed. Here, based on the defocus amount in the focus detection area in which the focus deviation amount with high reliability is calculated among the focus detection areas 401 in the priority frame 1201, a defocus amount to be selected in a defocus amount selection process for each focus mode to be performed in later-described step S705 is calculated. Details of the priority frame calculation process in step S701 will be described later with reference to FIGS. 8A and 8B.

In step S702, it is determined which one of the four focus modes described above is the current focus mode. If the determined focus mode is the tracking mode or the waiting mode, steps S703 and S704 are executed. If the determined focus mode is the reset mode or the near side reset mode, the process proceeds to step S705 without executing processes of steps S703 and S704.

In step S703, it is determined whether or not to use the auxiliary frame 1202 according to the calculation result of the priority frame calculation process performed in step S701. When the auxiliary frame 1202 is to be used, the defocus amount to be selected in the defocus amount selection process for each focus mode to be performed in step S705 described later is calculated based on the defocus amounts of the focus detection areas 401 in the auxiliary frame 1202. Details of an auxiliary frame process in step S703 will be described later with reference to FIG. 9.

In step S704, a correction frame process is performed according to the calculation result of the priority frame calculation process performed in step S701. Details of the correction frame process will be described later in detail with reference to FIG. 10. Briefly, it is determined whether or not to use the defocus amount of the correction frame. If the defocus amount of the correction frame is to be used, the defocus amount of the correction frame is calculated. It should be noted that the correction frame may be an area larger than the area of the priority frame 1201 and the auxiliary frame 1202, and in the present embodiment, an explanation is made by assuming that the entire AF frame 400 is the correction frame.

In step S705, a defocus amount selection process is performed to select which of the defocus amounts calculated in steps S701 to S704 is to be used in accordance with the focus mode. Further, the next focus mode is selected on the basis of the driving state of the lens, the in-focus state, the calculated defocus amount, and so forth. Details of the defocus amount selection process for each focus mode performed in step S705 will be described later with reference to FIGS. 11A to 11CB.

In step S706, on the basis of the defocus amount selected in step S705, the focusing drive information such as a driving amount and a driving direction of a lens for driving the focus lens 103 to the in-focus position is calculated, and the process proceeds to step S707. In step S707, the focus mode selected in step S705 is set as the next focus mode, and the processing is terminated.

Next, details of the priority frame calculation process performed in step S701 will be described with reference to FIGS. 8A and 8B. In step S801, focus detection areas in which highly reliable defocus amounts were calculated out of the focus detection areas 401 in the priority frame 1201 are set as candidate areas to be used in the subsequent processes, and the process proceeds to step S802. By thus excluding focus detection areas with low reliability for the focus detection result and selecting the defocus amounts in the focus detection areas in which a stable focus detection result is obtained, it is possible to prevent the focus lens 103 from being driven toward the wrong position or in the wrong direction, and prevent blurring. In addition, processing time can be reduced. Here, specifically, the candidate areas are set by comparing the reliability with a predetermined threshold value.

In step S802, it is determined whether or not the number of focus detection areas in which the defocus amounts within the predetermined depth of focus from the current focus state are calculated among the defocus amounts of the candidate areas set in step S801 is equal to or larger than a threshold value TH1. If the number is equal to or greater than the threshold value TH1, the process proceeds to step S803, and if the number is smaller than the threshold value TH1, the process proceeds to step S805. The threshold value TH1 is set as a transition condition from the reset mode or the near side reset mode to the tracking mode among the above-described transitions of the focus modes, in order to determine whether or not to make the transition based on how many focus detection areas fall within the in-focus range out of the focus detection areas in the priority frame 1201. In the present embodiment, the threshold value TH1 is assumed to be 3, however it may be a fixed value within the range from 1 to the number of focus detection areas (9 in this embodiment) in the priority frame 1201, or may be a variable depending on the situation. If the threshold value TH1 is 1, for example, it indicates that transition to the tracking mode is made if any one of the focus detection areas 401 in the priority frame 1201 is in the in-focus range. Conversely, if the threshold value TH1 is 9, for example, it means that the transition to the tracking mode is not made unless all the nine focus detection areas 401 in the priority frame 1201 are in the in-focus range.

In step S803, among the candidate areas set in step S801, a focus detection area/areas in which a defocus amount/amounts outside a predetermined depth of focus from the current focus state is/are calculated is/are excluded from the candidate areas. As a result, the remaining defocus amounts of the candidate areas are all within the predetermined focal depth from the current focus state, and the tracking mode in which the focus lens 103 is driven relatively small in order to follow the main subject in the vicinity of the in-focus state becomes possible.

In step S804, the return value as the calculation result of the priority frame calculation process is set to 1, and the process proceeds to step S806. On the other hand, in step S805, the return value as the calculation result of the priority frame calculation process is set to 0, and the process proceeds to step S806. The flows of the auxiliary frame process, the correction frame process, etc. differ according to the return value set here, and details will be described later.

In step S806, it is determined whether the number of candidate areas is equal to or larger than a threshold value TH2. If the number is equal to or larger than the threshold value TH2, the process proceeds to step S807. If the number is smaller than the threshold value TH2, the process proceeds to step S813, where the return value as the calculation result of the priority frame calculation process is set to −1, and the process is terminated as an error state. The threshold value TH2 is set as a threshold value for determining the minimum number of candidate areas to be used in the priority frame calculation process. In the present embodiment, the threshold value TH2 will be described as 2, however, it may be a fixed value within the range of 1 to the number of focus detection areas 401 within the priority frame 1201 (9 in the present embodiment), or may be a variable depending on the situation. Note that in a case where the threshold value TH2 is small, it indicates that if the number of the focus detection areas serving as the candidate areas among the focus detection areas 401 in the priority frame 1201 is small, an error is determined.

In step S807, an average defocus amount DefAve of the defocus amounts of the candidate areas remaining at the time of step S806 is calculated, and the process proceeds to step S808.

In step S808, it is determined whether or not all the defocus amounts of the candidate areas are within a predetermined amount with respect to the average defocus amount DefAve calculated in step S807. If it is judged that not all the defocus amounts are within the predetermined amount, the process advances to step S809. If it is judged that all the defocus amounts are within the predetermined amount, the process proceeds to step S812.

In step S809, the focus detection area having the defocus amount having the largest difference from the average defocus amount DefAve calculated in step S807 among the remaining candidate areas at the time of step S808 is excluded from the candidate areas, and the process proceeds to step S810.

In step S810, it is determined whether the number of candidate areas remaining after step S809 is less than or equal to the threshold value TH2. The process returns to step S807 until the number of candidate areas is equal to or less than the threshold value TH2, and processes from step S807 to step S809 are repeated, and when the number of candidate areas becomes equal to or less than the threshold value TH2, the process proceeds to step S811. The processes from step S807 to step S810 is repeated until all the number of the candidate areas becomes equal to or less than the threshold value TH2 or all the defocus amounts of the candidate areas fall within the predetermined amount with respect to the average defocus amount DefAve, which is the determination condition of step S808. As a result, even if the defocus amounts of the candidate areas deviate due to the perspective conflict of subjects or the like, it is possible to use the focus detection results that are likely corresponding to the main subject in the focus detection areas in which similar focus detection results were obtained. Accordingly, it is possible to calculate a stable defocus amount.

In step S811, the average defocus amount DefAve of the defocus amounts of the candidate areas remaining at the time of step S810 is calculated, and the process proceeds to step S812. In step S812, the priority frame calculation process returns the return value set in step S804 or S805 as the calculation results of the priority frame calculation process, the average defocus amount DefAve calculated in steps S807 to S811 as Def1, and the number of remaining candidate areas, and the processing is terminated.

Next, the details of the auxiliary frame process performed in step S703 of FIG. 7 which is a feature of the present invention will be described with reference to FIG. 9.

Figure 8A:
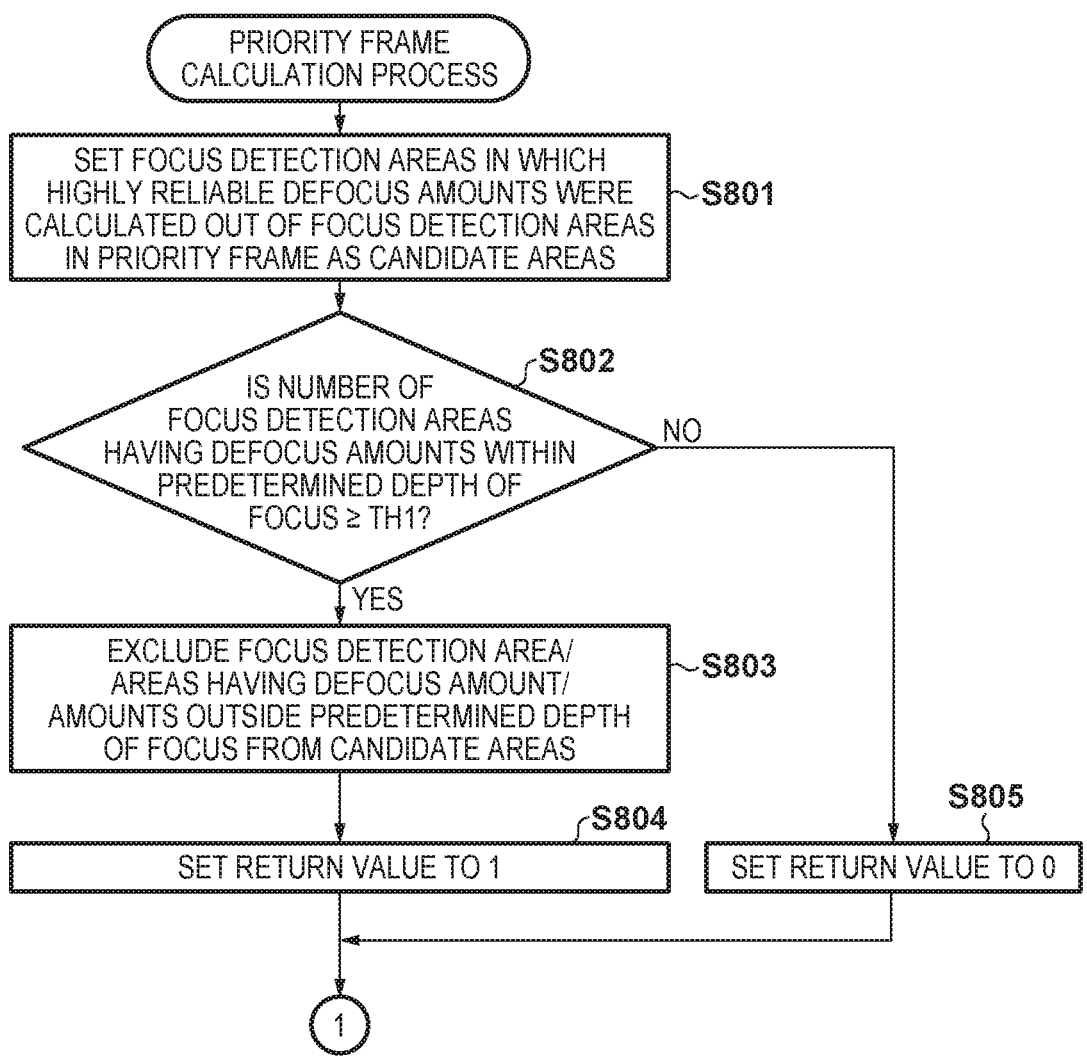
FIGS. 8A and 8B show a flowchart of a priority frame calculation process according to a first embodiment.
Figure 8B:
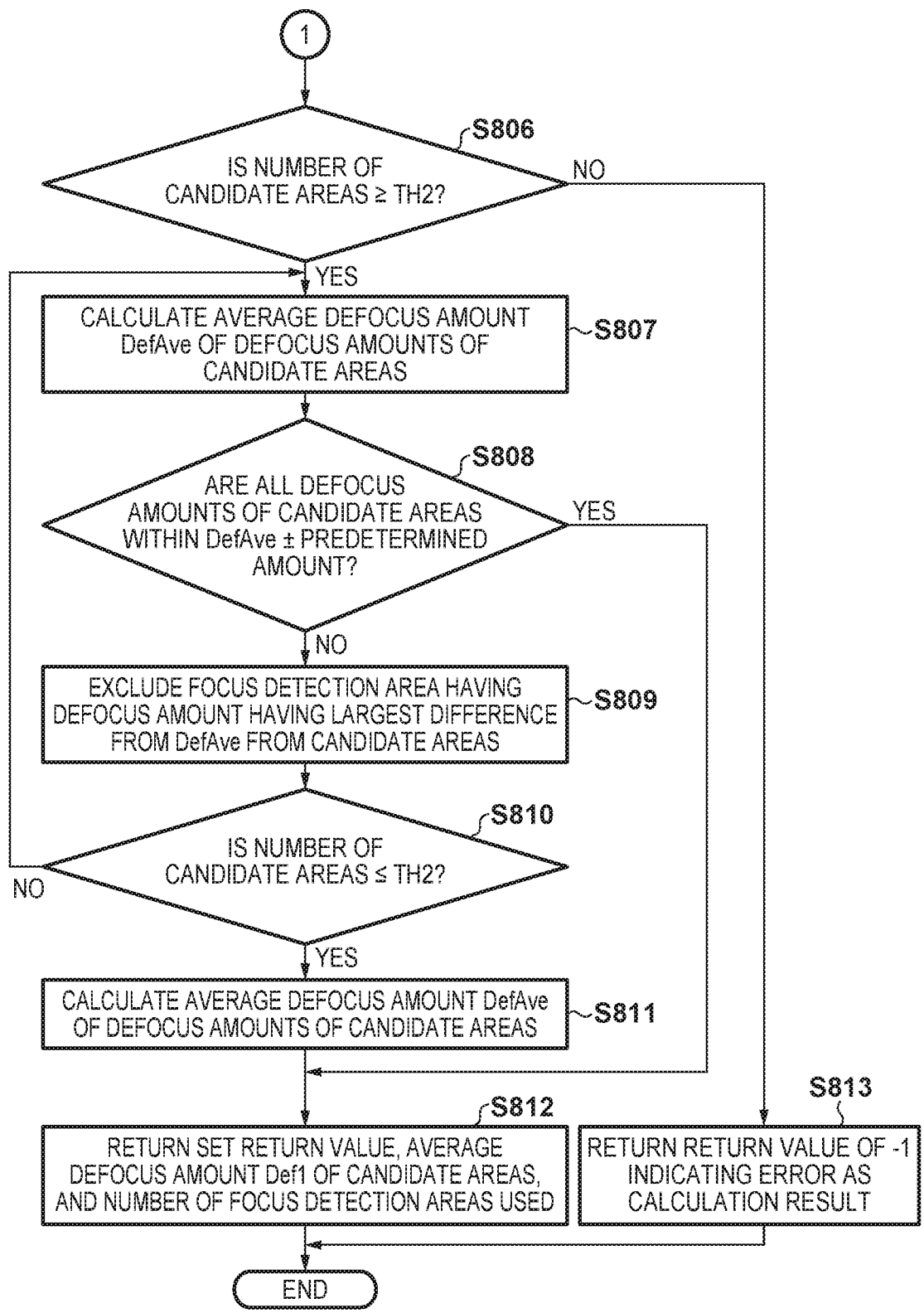

In step S901, it is determined whether or not the return value of the priority frame calculation process set in the flow of FIGS. 8A and 8B is 0 or −1. If it is determined that the return value is 0 or −1, the process proceeds to step S902. If it is determined that the return value is not 0 or −1, the process proceeds to step S907, an auxiliary frame valid flag is set to 0, and the process is terminated.

The case where the return value of the priority frame calculation process is not 0 or −1 indicates the following state. In other words, the camera operates in the tracking mode under the situation in which, in the priority frame 1201, there is/are the focus detection area/areas having the defocus amount/amounts within the in-focus range, and the main subject is kept detected in the priority frame 1201 and the in-focus state is maintained.

On the other hand, the case where the return value of the priority frame calculation process is 0 or −1 indicates the following state. In other words, the camera operates in the reset mode under the situation in which, in the priority frame 1201, there is no focus detection area having the defocus amount within the in-focus range, and focus control is performed in order to focus on a subject within the priority frame 1201. Further, the case where the return value is 0 or −1 also indicates the state in which the subject that has been detected in the priority frame 1201 disappears when the camera operates in the tracking mode or the waiting mode. In such case, by performing the processes from step S902 onwards, it is possible to switch between whether or not to maintain the tracking mode using the auxiliary frame 1202.

In step S902, among the focus detection areas 401 in the auxiliary frame 1202 adjacent to the priority frame 1201, a focus detection area/areas having a defocus amount/amounts within a predetermined depth of focus with respect to the current focus state is/are set as a candidate area/areas, and the process proceeds to step S903. In step S903, it is determined whether there is at least one candidate area set in step S902. If there is one or more candidate areas, the process proceeds to step S904. If there is no candidate area, the process advances to step S907 where the auxiliary frame valid flag is set to 0, and the processing is terminated.

In step S904, an average defocus amount Def2 of the defocus amounts of the candidate area/areas in the auxiliary frame 1202 set in step S902 is calculated. In step S905, it is judged whether or not the number of focus detection areas having the defocus amounts indicating a near side by the predetermined focal depth or more with respect to the current focus state in the focus detection areas 401 in the priority frame 1201 is equal to or less than a predetermined number. If the number is equal to or less than the predetermined number, the process proceeds to step S906. If the number is greater than the predetermined number, the process proceeds to step S907 where the auxiliary frame valid flag is set to 0, and the processing is terminated. In a case where the number of focus detection areas having the defocus amounts indicating near side by the predetermined focal depth or more is large, it indicates that another subject appears on the near side in the priority frame 1201. In that case, the auxiliary frame 1202 is not used, and focus control is performed based only on the defocus amounts of the focus detection areas within the priority frame 1201. By doing so, if the camera operates in the tracking mode under the state in which the miscellaneous subject such as the background is focused, the focus mode is transited to the near side reset mode, thereby making it easier to focus on the nearest subject.

In step S906, the auxiliary frame valid flag is set to 1, and the processing is terminated. As described above, by performing focus control using the defocus amounts of the auxiliary frame 1202 depending upon the situation, it is possible to maintain the in-focus state in a wide range of the screen.

Figure 10:
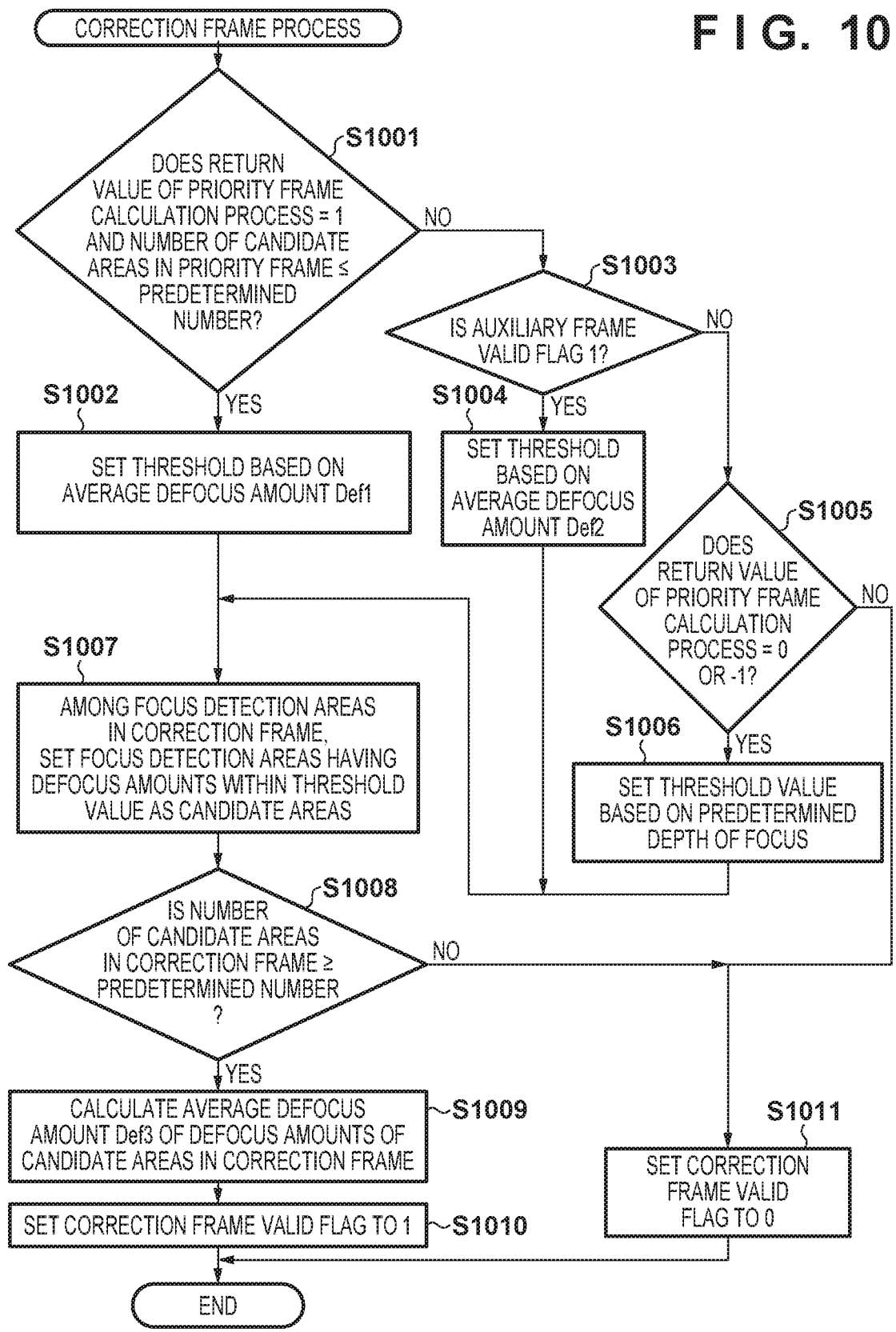
FIG. 10 is a flowchart showing a correction frame process according to the embodiment.

Next, the details of the correction frame process performed in step S704 of FIG. 7 which is a feature of the present invention will be described with reference to FIG. 10.

In step S1001, it is determined whether or not the return value of the priority frame calculation process set in the flow of FIGS. 8A and 8B is 1 and the number of the candidate areas is equal to or less than a predetermined number. If the determination is affirmative, the process proceeds to step S1002, and if not, the process proceeds to step S1003. Here, the reason of determining whether the number of candidate areas is equal to or less than the predetermined number is as follows. First, if there are many candidate areas, even if the defocus amounts of the focus detection areas vary, since an averaged value is used at last, it is possible to suppress the variation to some extent. On the other hand, if the number of the candidate areas is small, since the influence of the variation becomes large, whether or not to use the focus detection result of the peripheral focus detection areas to correct the variation is determined. It should be noted that the predetermined number may be a fixed value or may be changed according to the focus mode. For example, a different predetermined number may be used in the tracking mode which uses the focus detection result of the auxiliary frame 1202 from other modes, and in the tracking mode, since the number of the candidate areas is small, the predetermined number may be set larger so that the focus detection result is corrected more often. In the case of the reset mode, since it is desirable to obtain the defocus amount using only the focus detection results of the priority frame 1201, the predetermined number is set smaller so as not to use the correction frame.

In step S1002, based on the average defocus amount Def1 calculated in the priority frame calculation process, a threshold value to be used in a process of step S1007 described later is set.

Figure 9:
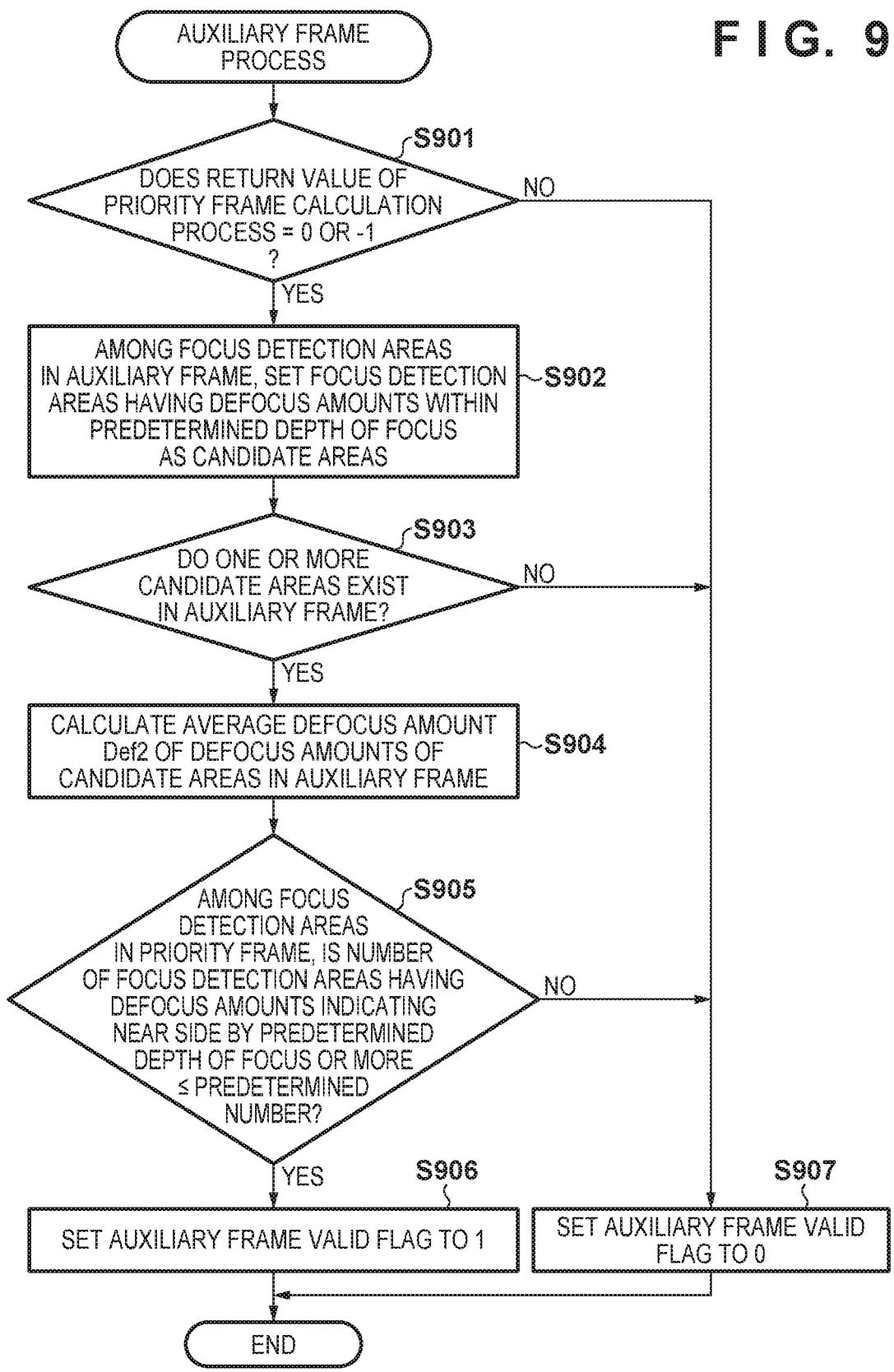
FIG. 9 is a flowchart showing an auxiliary frame process according to the embodiment.

In step S1003, it is determined whether or not the auxiliary frame valid flag set in the flow of FIG. 9 is 1. If the flag is 1, the flow advances to step S1004; if the flag is 0, the process proceeds to step S1005. In step S1004, a threshold value to be used in the process of step S1007 is set based on the average defocus amount Def2 calculated in the auxiliary frame process.

In step S1005, it is determined whether or not the return value of the priority frame calculation process set in the flow of FIGS. 8A and 8B is 0 or −1. If 0 or −1, the process proceeds to step S1006, and if not, the process proceeds to step S1011. In step S1006, a threshold value to be used in the process of step S1007 is set based on a predetermined depth of focus.

In step S1007, the focus detection areas having the defocus amounts within the threshold value set in step S1002, S1004, or S1006 among the focus detection areas 401 in the correction frame are set as candidate areas, and the process proceeds to step S1008. The threshold value set in step S1002, S1004, or S1006 is a value that determines how close the defocus amount to be used for correction to the defocus amount of the currently captured subject, out of the defocus amounts of the focus detection areas in the correction frame. When the threshold value is small, it indicates that correction is performed using only the defocus amounts close to the in-focus state.

In step S1008, it is determined whether or not the number of candidate areas set in step S1007 is equal to or larger than a predetermined number. If it is equal to or larger than the predetermined number, the process proceeds to step S1009, and if smaller than the predetermined number, the process proceeds to step S1011. In step S1009, the average defocus amount Def3 of the defocus amounts of the candidate areas set in step S1007 is calculated.

In step S1010, the correction frame valid flag is set to 1 in order to indicate that the defocus amounts have been calculated using the focus detection result of the correction frame, and the processing is terminated. In step S1011, a correction frame valid flag is set to 0 in order to indicate that the defocus amount is not calculated using the focus detection result of the correction frame, and the processing is terminated.

In the present embodiment, if the focus detection result in the correction frame is also less than the predetermined number, the correction frame valid flag is set to 0, the correction process is not performed, and the subsequent processes are performed based on the result of the priority frame 1201. Alternatively, the focus lens may be temporarily stopped so as not to perform focus control.

Next, the details of the defocus amount selection process for each focus mode performed in S705 in FIG. 7 will be described with reference to FIGS. 11A to 11CB.

Figure 11A:
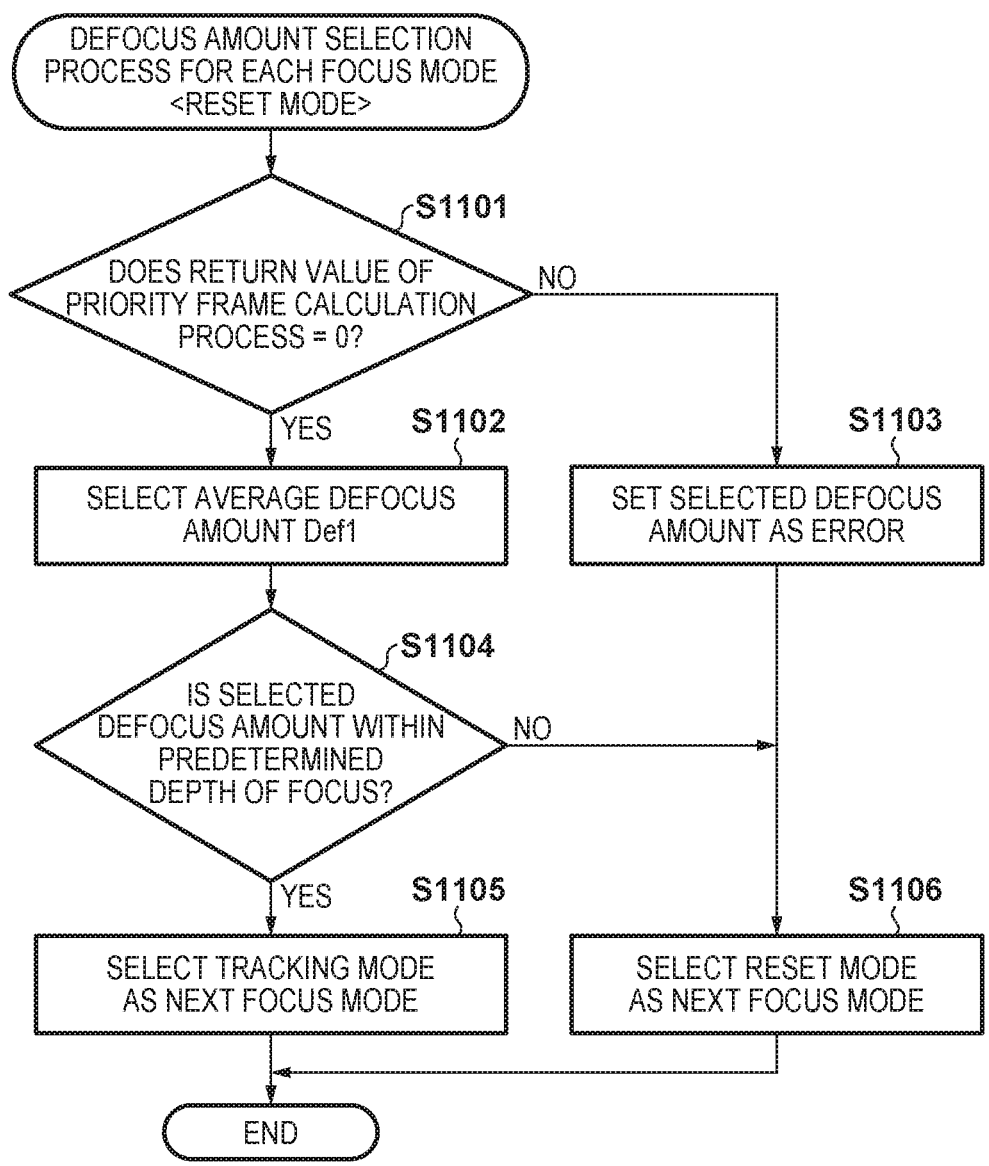
FIG. 11A is a flowchart showing defocus amount selection process in a reset mode according to the embodiment.
Figure 11B:
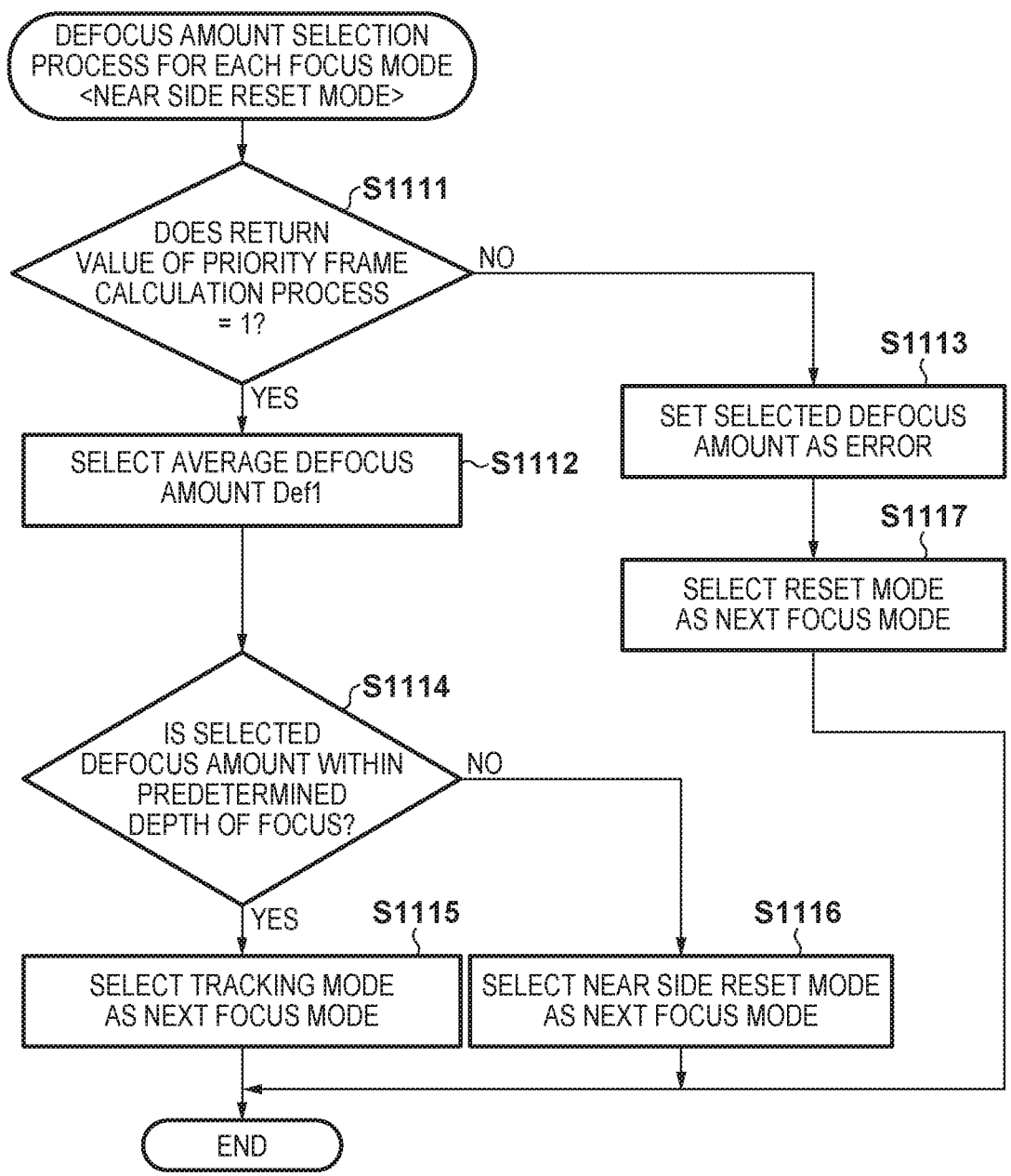
FIG. 11B is a flowchart showing a defocus amount selection process in a near side reset mode according to the embodiment.
Figure 11C:
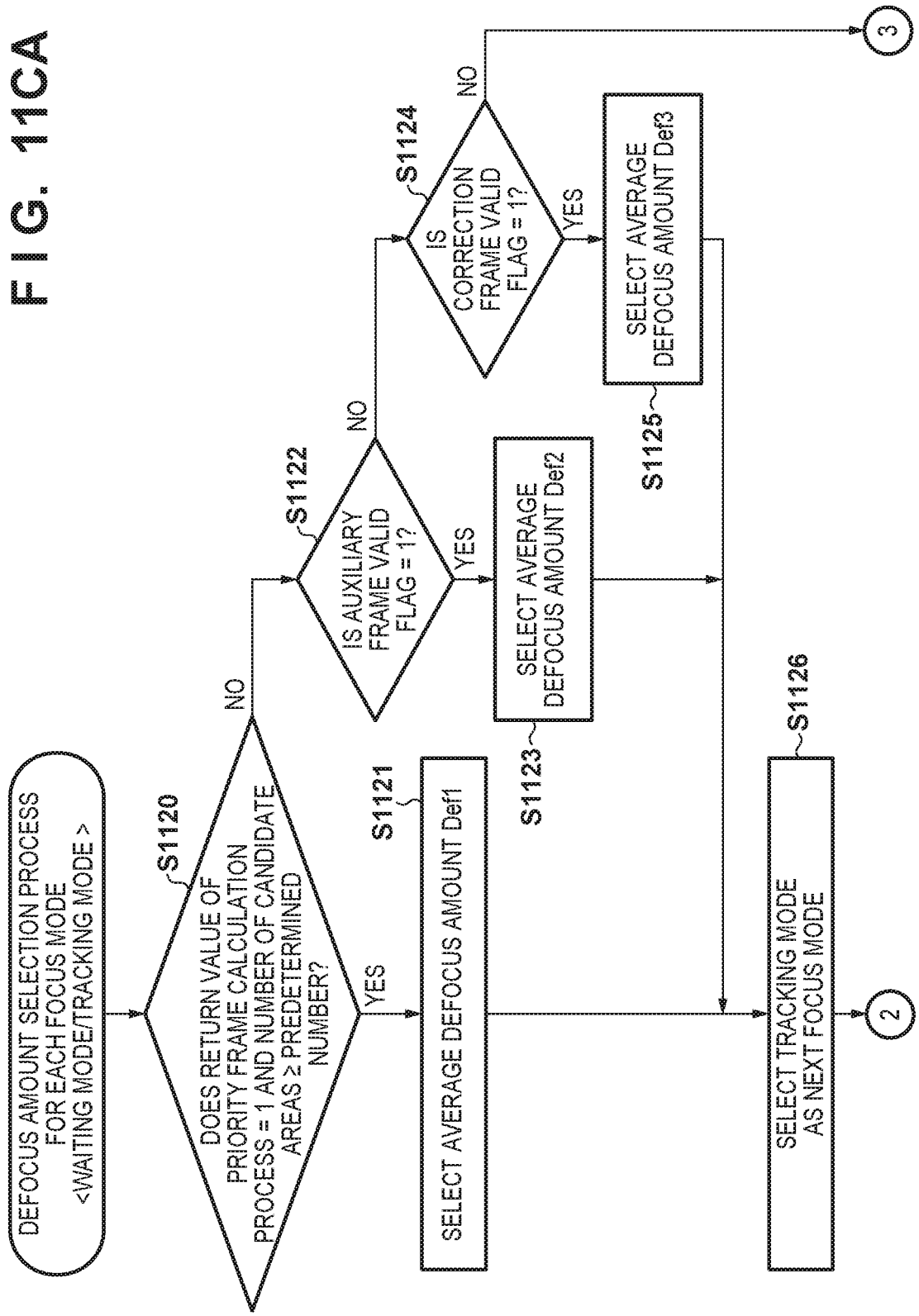
FIGS. 11CA and 11CB show a flowchart showing a defocus amount selection process in a waiting mode or tracking mode according to the embodiment.
Figure 11C:
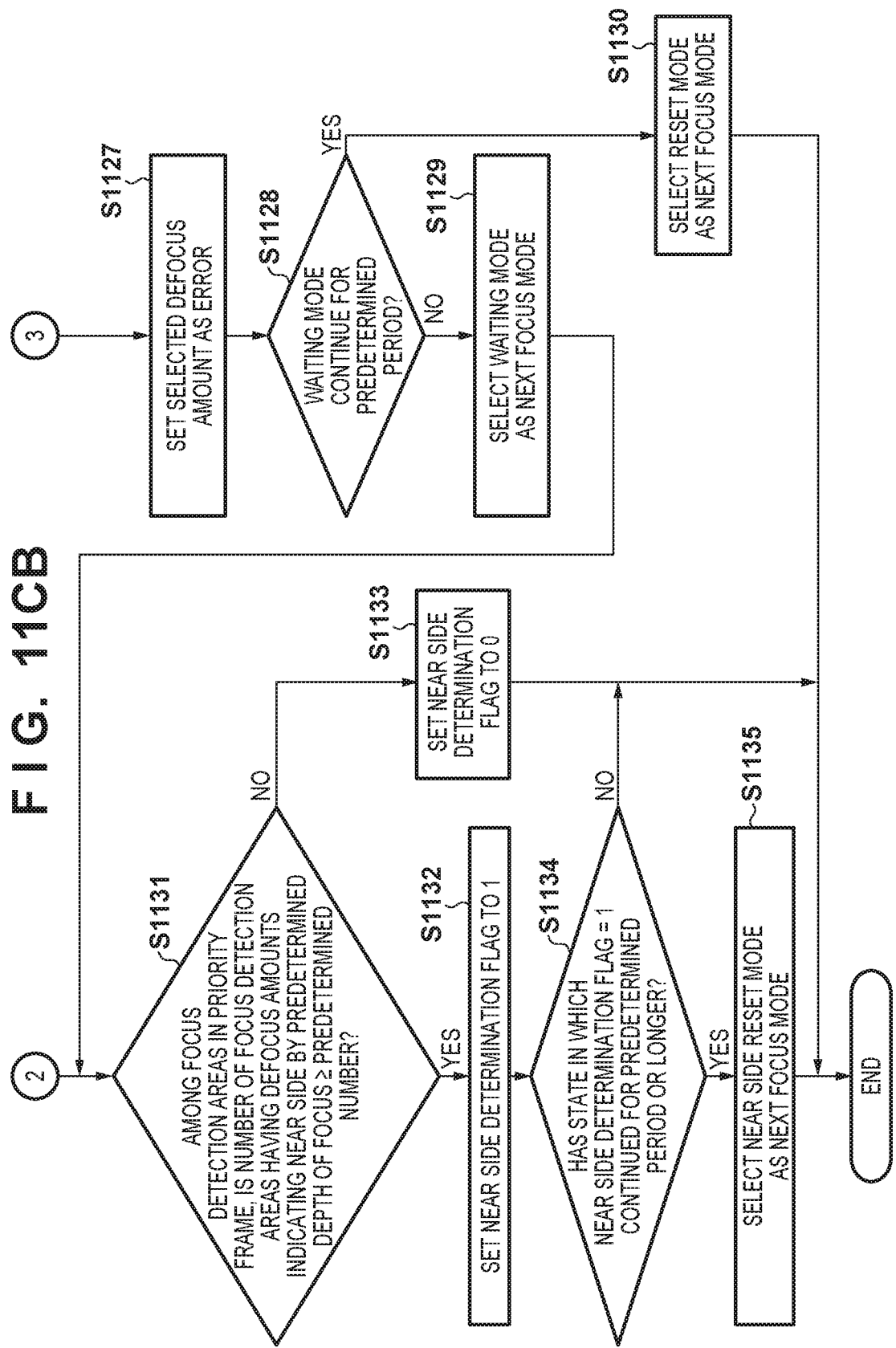

FIG. 11A is a flowchart of the defocus amount selection process when the focus mode is the reset mode, FIG. 11B is a flowchart of the defocus amount selection process when the focus mode is the near side reset mode, and FIGS. 11CA and 11CB show a flowchart of the defocus amount selection process when the focus mode is the waiting mode or the tracking mode. Each process will be described in detail below.

In step S1101 of FIG. 11A, it is determined whether or not the return value of the priority frame calculation process set in the flow of FIGS. 8A and 8B is 0. If it is determined to be 0, the process proceeds to step S1102, whereas if it is determined to be not 0, the process proceeds to step S1103.

In step S1102, as a defocus amount (selected defocus amount) for calculating the focusing drive information such as a driving amount and a driving direction of a lens for driving the focus lens 103 to the in-focus position, and the like, the average defocus amount Def1 calculated in the priority frame calculation process is selected.

In step S1104, it is determined whether the defocus amount selected in step S1102 is within the predetermined depth of focus with respect to the current focus state. If the defocus amount is within the predetermined depth of focus, the process proceeds to step S1105, whereas if the defocus amount is larger than the predetermined depth of focus, the process proceeds to step S1106. In step S1105, the tracking mode is selected as the next focus mode, and the processing is terminated.

On the other hand, in step S1103, the selected defocus amount is set as an error, and the process proceeds to S1106. In step S1106, the reset mode is selected as the next focus mode, and the processing is terminated.

In step S1111 of FIG. 11B it is determined whether or not the return value of the priority frame calculation process set in the flow of FIGS. 8A and 8B is 1. If it is determined to be 1, the process proceeds to step S1112, whereas if it is determined to be not 1, the process proceeds to step S1113.

In step S1112, as in the reset mode, the average defocus amount Def1 calculated in the priority frame calculation process is selected as a selected defocus amount.

In step S1114, it is determined whether the defocus amount selected in step S1112 is within the predetermined depth of focus with respect to the current focus state. If the defocus amount is within the predetermined depth of focus, the process proceeds to step S1115, whereas if the defocus amount is larger than the predetermined depth of focus, the process proceeds to step S1116. In step S1115, the tracking mode is selected as the next focus mode, and the processing is terminated, and in step S1116, the near side reset mode is selected as the next focus mode, and the processing is terminated On the other hand, in step S1113, the selected defocus amount is set as an error, and the process proceeds to step S1117. In step S1117, the reset mode is selected as the next focus mode, and the processing is terminated.

In step S1120 of FIG. 11CA, it is determined whether or not the return value of the priority frame calculation process set in the flow of FIGS. 8A and 8B is 1 and the number of the candidate areas is equal to or greater than a predetermined number. If the determination is affirmative, the process proceeds to step S1121, and if not, the process proceeds to step S1122. In step S1121, the average defocus amount Def1 calculated in the priority frame calculation process is selected as a selected defocus amount, and the process proceeds to step S1126.

In step S1122, it is determined whether or not the auxiliary frame valid flag is 1. If the flag is 1, the flow advances to step S1123; if the flag is not 1, the process proceeds to step S1124. In step S1123, the average defocus amount Def2 calculated in the auxiliary frame process is selected as the selected defocus amount, and the process proceeds to step S1126.

In step S1124, it is determined whether or not the correction frame valid flag is 1. If the flag is 1, the flow advances to step S1125; if the flag is not 1, the process proceeds to step S1127. In step S1125, the average defocus amount Def3 calculated in the correction frame process is selected as the selected defocus amount, and the process proceeds to step S1126. In step S1126, the tracking mode is selected as the next focus mode, and the process proceeds to step S1131.

In step S1127, the selected defocus amount is set as an error, and the process proceeds to S1128. In step S1128, it is determined whether the waiting mode has been continued as the focus mode for a predetermined period, and if it is, the process proceeds to step S1129, whereas if not, the process proceeds to step S1130. In step S1129, the waiting mode is selected as the next focus mode, and the process proceeds to step S1131. On the other hand, in step S1130, the reset mode is selected as the next focus mode, and the processing is terminated.

In step S1131, among the focus detection areas 401 in the priority frame 1201, it is judged whether or the number of the focus detection areas having the defocus amounts indicating near side with respect to the current focus state by a predetermined depth of focus or more is equal to or greater than a predetermined number. If the number is equal to or greater than the predetermined number, the process proceeds to step S1132, whereas if the number is smaller than the predetermined number, the process proceeds to step S1133. In step S1132, a near side determination flag is set to 1. In step S1133, the near side determination flag is set to 0, and the processing is terminated.

In step S1134, it is determined whether or not the state in which the near side determination flag is 1 set in step S1132 or S1133 has been continued for a predetermined period or longer. If the state has been continued for the predetermined period or longer, the process proceeds to step S1135, whereas if the state has been continued for less than the predetermined period, the processing is terminated. In step S1135, the near side reset mode is selected as the next focus mode, and the processing is terminated.

According to the first embodiment as described above, focus detection is performed in a wide area of the screen during on-imaging plane phase difference focus detection, and it is possible to continue to focus more stably on the main subject, and to prevent the focus from fixing on background.

Second Embodiment

Next, a second embodiment of the present invention will be described in detail. In the second embodiment, the priority frame detection process is different from the process described above with reference to FIGS. 8A and 8B in the first embodiment. Since the second embodiment is the same as the first embodiment except for the above point, the explanation will be omitted, and the priority frame detection process will be described below.

Figure 13A:
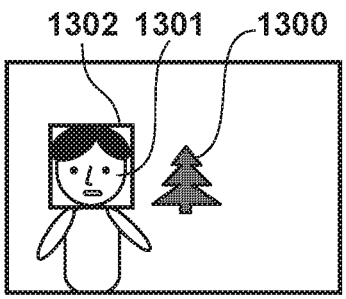
FIGS. 13A to 13L are diagrams for explaining an outline of a second embodiment.
Figure 13B:
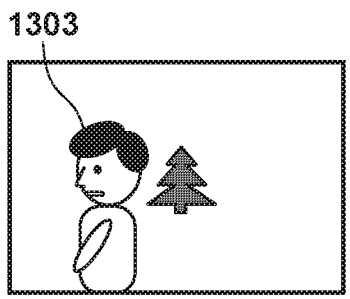
Figure 13C:
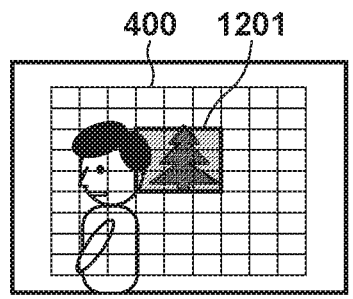

FIGS. 13A to 13C are diagrams for explaining the problem to be solved in the second embodiment. FIG. 13A shows a face AF state. A miscellaneous subject 1300 is a subject on the infinity side and is located near the center of the screen. A main subject 1301 is a person, and it is located in a place off the center of the screen. The main subject 1301 is in a state in which the face detection processing unit 211 detects a face and a face AF frame 1302 is set as an AF frame.

FIG. 13B shows a state in which the main subject 1301 in FIG. 13A faces sideways. If the subject faces sideways, there may be a case in which face detection with profile is not successful and face AF frame 1302 cannot be set. In this case, the AF control is switched from face AF to center-weighted AF.

FIG. 13C shows a state in which the state is switched to the center-weighted AF under the state shown in FIG. 13B. The AF frame 400 and the priority frame 1201 described with reference to FIGS. 12A and 12B are set at the center of the screen, and the focusing operation is performed on the miscellaneous subject 1300 located at the center of the screen.

As explained above, when the face of the main subject is temporarily not detected due to some influence, a transition is made to the center-weighted AF. Therefore, even if there is a main subject, there are cases where the miscellaneous subject in the center of the screen is focused.

Figure 13D:
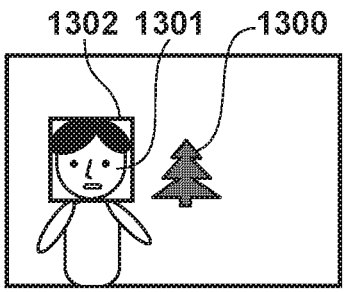
Figure 13E:
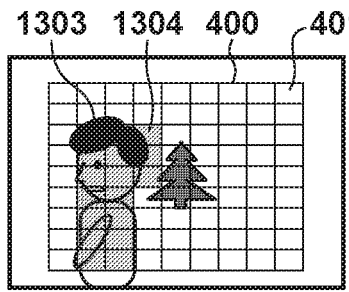
Figure 13F:
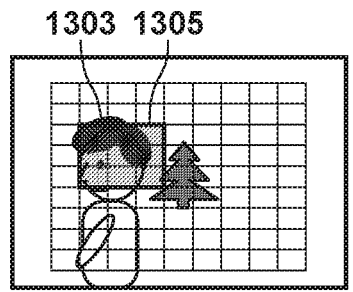

FIGS. 13D to 13F are diagrams for explaining effects of a face detection AF in the second embodiment. FIG. 13D shows the face AF state. Since FIG. 13D is the same as FIG. 13A, its explanation will be omitted.

FIG. 13E shows a state in which the main subject 1301 in FIG. 13D faces sideways. In this state, the AF frame 400 is placed, and focus detection processing is performed for each focus detection area 401. Then, the focus detection area close to the current in-focus state is selected using the focus detection result. The shaded portion in FIG. 13E is the focus detection area 1304 which is the selected focus detection area.

FIG. 13F shows a case where the face detection AF is switched to a (center) weighted AF under the state shown in FIG. 13E. In the prior art, the priority frame 1201 is arranged at the center of the screen, however, in the second embodiment, the priority frame 1305 is arranged in the portion of the focus detection area 1304 detected in FIG. 13E. As a result, AF control can be performed on the main subject 1303 facing sideways.

In this way, by arranging the AF frame 400 at the time of switching the AF control, selecting a frame close to the in-focus state, and changing the position of the priority frame 1201, even in a situation where the face detection is unstable, it becomes possible to keep focusing on the main subject.

Figure 13G:
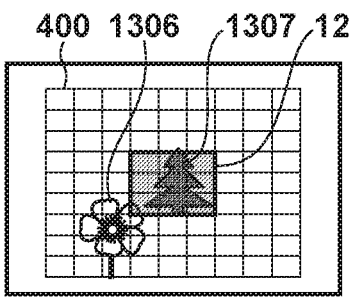
Figure 13H:
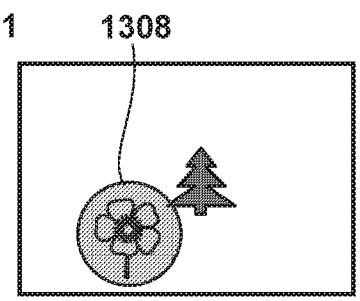
Figure 13I:
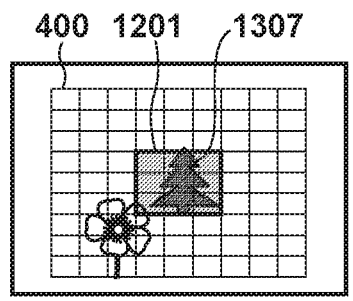

Further, the second embodiment is also effective in manual focus operation. FIGS. 13G to 13I are diagrams for explaining problems in the manual focus operation.

FIG. 13G shows a state in which the focusing operation is performed by the center-weighted AF with respect to the miscellaneous subject 1307. The main subject 1306 is a subject on the near side, and it is located at a position off the center of the screen. Since the main subject 1306 is out of the center of the screen, it does not become a target subject in the center-weighted AF.

FIG. 13H shows a state in which control is made to focus on the main subject 1306 in FIG. 13G by external manual focus operation. This is a state in which the focus is changed from the miscellaneous subject 1307 to the main subject 1306 by a user operating the focus ring or the like of the lens operation unit 107. In this case, if the user determines that the portion indicated by the region 1308 is in focus, the user stops the focus operation.

FIG. 13I shows a case where the manual focus operation is switched to the center weighted AF under the state shown in FIG. 13H. The priority frame 1201 described with reference to FIGS. 12A and 12B is set at the center of the screen, and a focus control is performed on the miscellaneous subject 1307.

As described above, even if the user performs the focus operation and focuses on a subject located at a position off the center of the screen, when the user ends the focus operation, the center-weighted AF is performed again and the miscellaneous subject 1307 located at the center of the screen is focused again even though there is the subject to be focused.

Figure 13J:
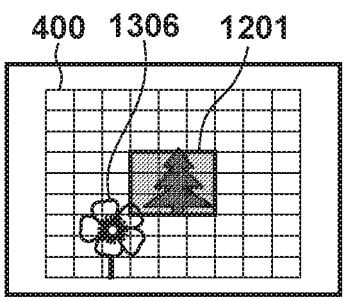
Figure 13K:
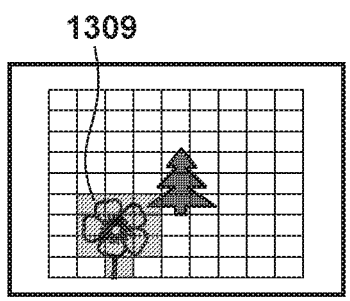
Figure 13L:
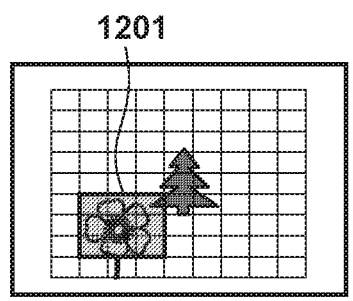

FIGS. 13J to 13L are diagrams for explaining an effect at the time of manual focus operation in the second embodiment. FIG. 13J shows a state in which the focus control is performed with respect to the miscellaneous subject 1307 by the center-weighted AF. Since it is the same as FIG. 13G, the explanation will be omitted.

FIG. 13K shows a state in which control is made to focus on the main subject 1306 in FIG. 13J by a manual focusing operation. In this state, the AF frame 400 is set and focus detection processing is performed. From the focus detection result, focus detection areas close to the current in-focus state are selected. There are a plurality of focus detection areas selected, and the shaded area in FIG. 13K is an in-focus detection area 1309.

FIG. 13L shows a case where the manual focus operation is switched to the (center) weighted AF under the state shown in FIG. 13K. The priority frame 1201 is placed in the in-focus detection area 1309 detected in FIG. 13K. In this way, even when the subject is changed by manual focus operation, the AF control can be performed on the subject aimed at by the user.

In this way, by selecting a frame close to the current in-focus state at the time of switching of the AF control and at the end of the focus operation and changing the position of the priority frame 1201, it is possible to continuously focus on the main subject aimed at by the user.

Figure 14:
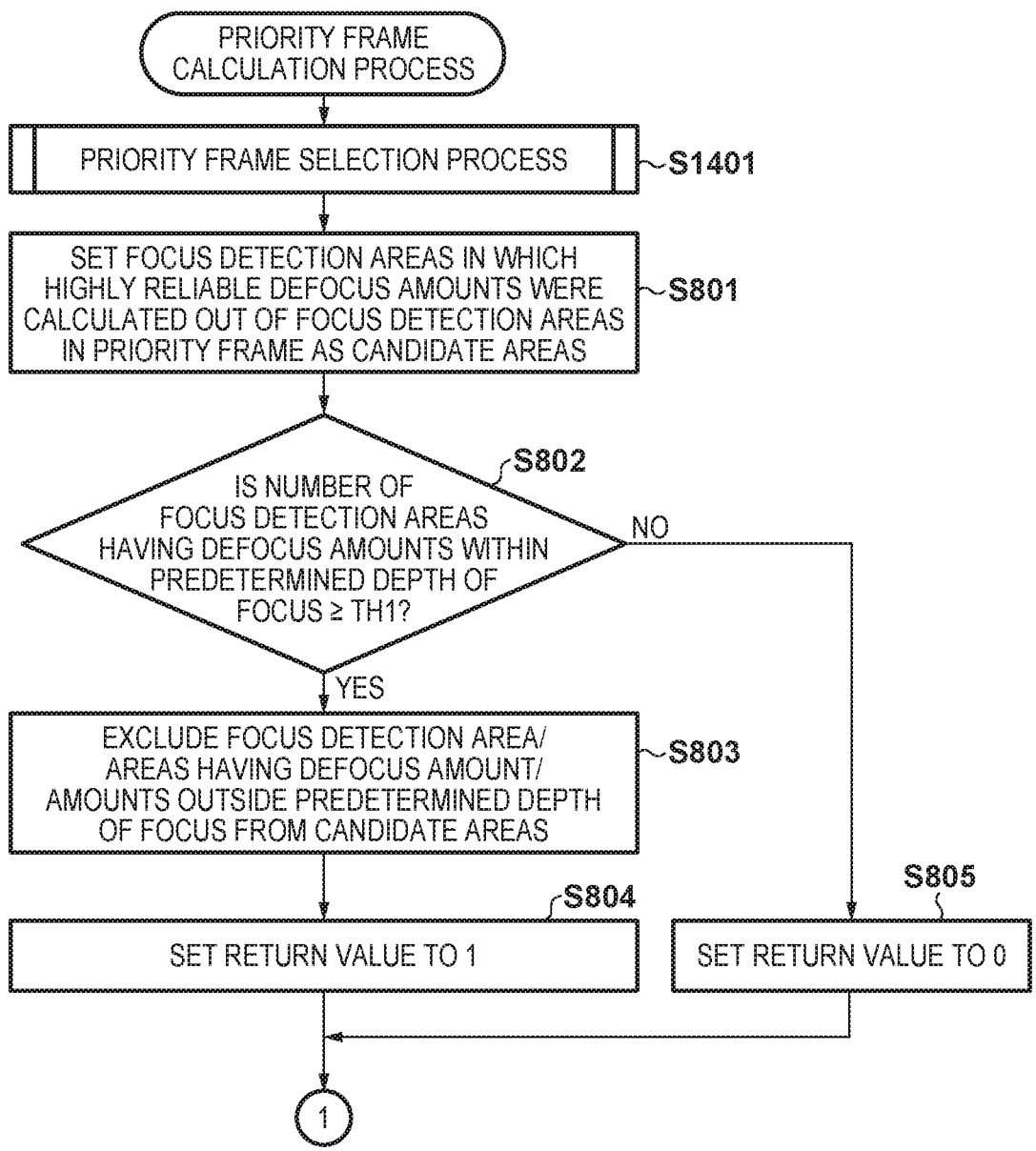
FIG. 14 is a flowchart showing a priority frame calculation process according to the second embodiment.
Figure 15:
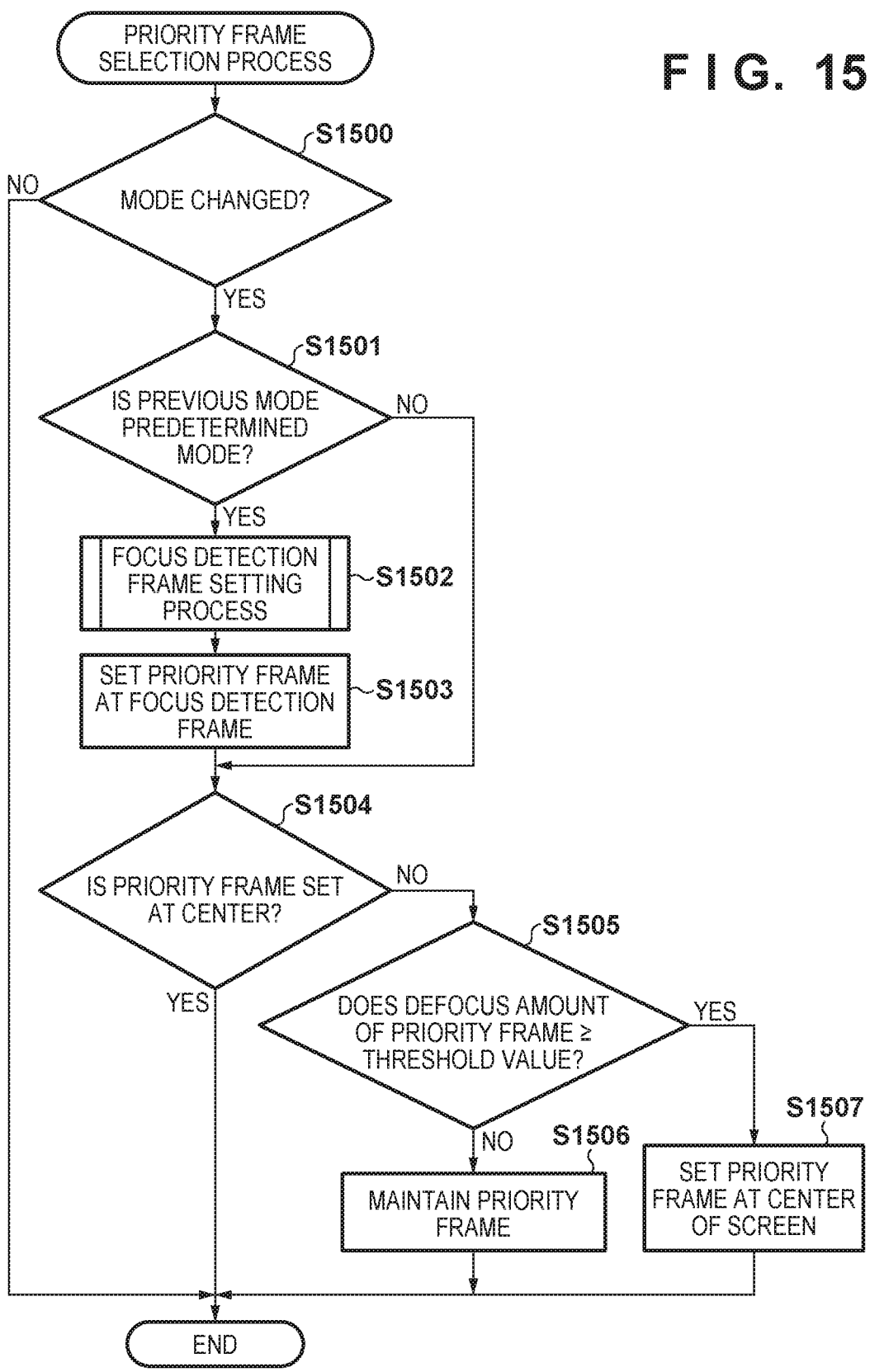
FIG. 15 is a flowchart showing a priority frame selection process according to the second embodiment.
Figure 16:
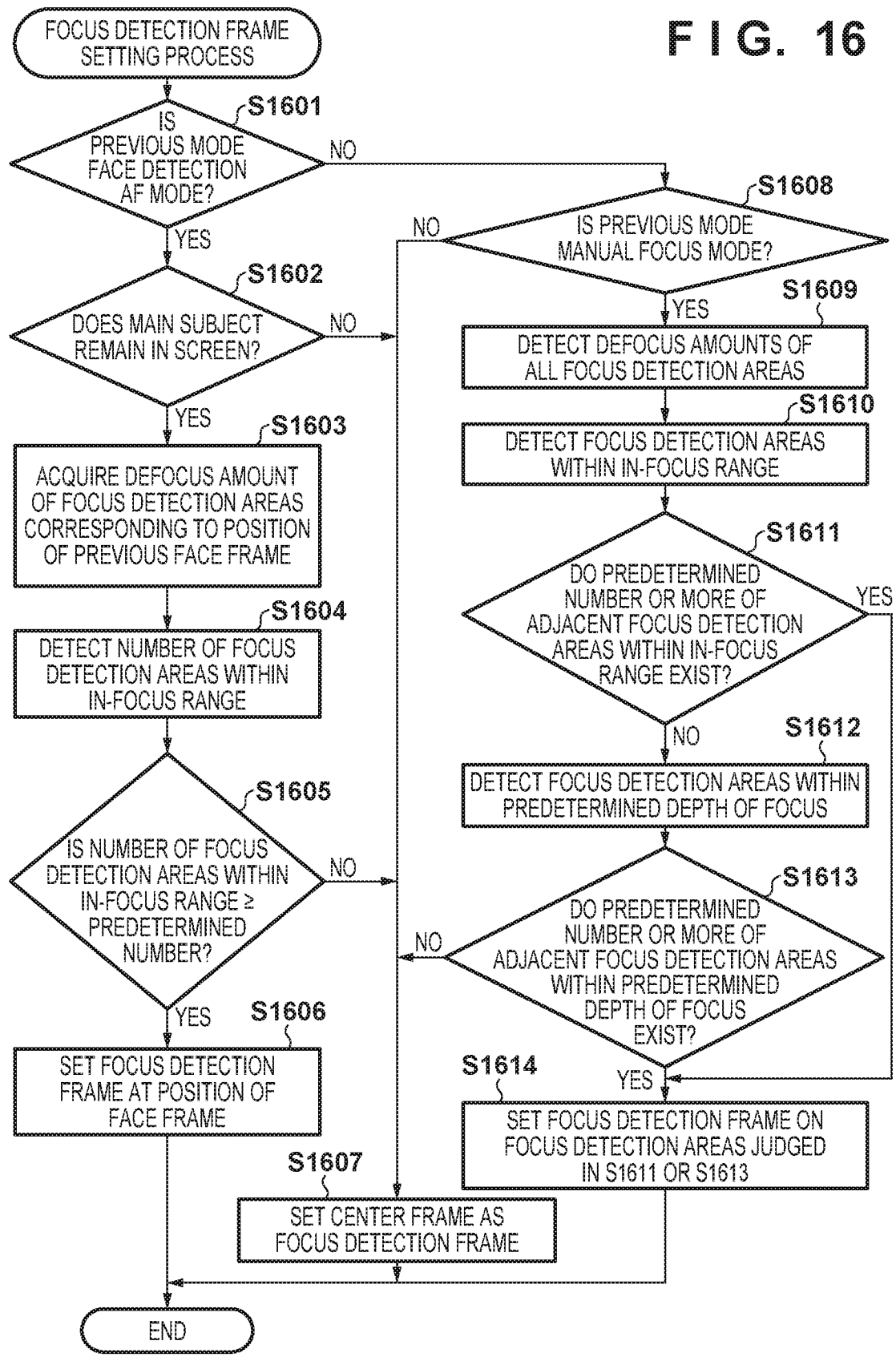
FIG. 16 is a flowchart showing a focus detection frame setting process according to the second embodiment.

Next, processing for realizing the above control will be described with reference to flowcharts of FIGS. 14 to 16. FIG. 14 is a flowchart for explaining a priority frame calculation process. In this process, a priority frame selection process of step S1401 is added to the processing of FIGS. 8A and 8B described above. Since the processes other than step S1401 are the same as the processes in FIGS. 8A and 8B, the processes of step S806 and subsequent steps are not shown, the same step numbers are assigned to the same processes, and their explanation is omitted.

Next, with reference to FIG. 15, priority frame selection processing performed in step S1401 will be described. In step S1500, it is determined whether or not the mode is switched. If it is not switched, the process returns to the process of FIG. 14, and if it is switched, the process proceeds to step S1501. In step S1501, it is determined whether the previous mode was a predetermined mode. In the second embodiment, the predetermined mode includes a face detection AF mode and a manual focus (MF) mode. If the mode is the predetermined mode, the process proceeds to step S1502, and if not, the process proceeds to step S1504.

In step S1502, process for setting an focus detection frame is performed. Here, a focus detection area focused in the previous focus detection processing is detected from the focus detection areas 401, and the focus detection frame is set based on the detected focus detection area. This process will be described later in detail with reference to FIG. 16.

In step S1503, the priority frame 1201 is set at the focus detection frame set in step S1502. In step S1504, it is determined whether the priority frame 1201 is set at the center (initial position). If it is set at the center, the process is ended, and if not, the process proceeds to step S1505.

In step S1505, it is determined whether or not the defocus amount of the set priority frame 1201 is equal to or larger than a threshold value. In the second embodiment, the threshold value is set to 5 times the depth of focus, and when blur corresponding to more than 5 times the depth of focus occurs, it is determined that the subject has changed, and the process proceeds to step S1507. If the defocus amount is less than the threshold value, the process proceeds to step S1506.

In step S1506, it is determined that the subject has not changed, the priority frame 1201 is maintained, and the process is terminated. In step S1507, there is a possibility that the subject has been changed, so the priority frame 1201 is returned to the center of the screen and the processing is terminated.

Next, focus detection frame setting process performed in step S1502 will be described with reference to FIG. 16. In step S1601, whether or not the previous mode is the face detection AF mode is determined. If the face detection AF mode, the process proceeds to step S1602, otherwise, the process proceeds to step S1608.

In step S1602, it is determined whether or not a main subject remains in the screen. In this process, whether a face frame has disappeared owing to the main subject moving out of the screen or whether the main subject remains in the screen is judged from the movement amount and position of the face. Judgment is made based on whether or not both of the following two conditions are satisfied.

Judgement (1): A case where the amount of movement of the face frame in the vertical direction or the horizontal direction exceeds a predetermined amount Judgment (2): A case where the position of the face frame at the time of switching modes is at the edge of the screen The judgement (1) is aimed at judging the presence or absence of a movement of a person, and the judgment (2) is aimed at judging whether the person has disappeared outside the screen in the course of movement.

Here, as an example, it is assumed that the predetermined amount in the judgement (1) is ⅓ of the screen. If both of the judgment (1) and the judgment (2) are not satisfied, it is judged that the main subject remains in the screen, and the process shifts to step S1603; otherwise, the process transits to step S1607.

In step S1603, the defocus amounts of the focus detection areas corresponding to the position of the previous face frame are acquired from the AF frame 400. In the next step S1604, using the defocus amounts acquired in step S1603, the number of focus detection areas within an in-focus range is detected. In step S1605, it is determined whether or not the number of focus detection areas detected in step S1604 is equal to or larger than a predetermined number. This is a process of verifying the likelihood of the subject. Here, as an example, the predetermined number is set to the number of frames corresponding to half or more of the area of the face frame. If the number of focus detection areas detected in step S1604 is equal to or larger than the predetermined number, the process proceeds to step S1606; otherwise, the process proceeds to step S1607.

In step S1606, the focus detection frame (focus detection areas of 3×3) is set around the frame corresponding to the position of the face frame, and the processing is terminated. In step S1607, the center frame (3×3 focus detection areas) is set as the focus detection frame.

On the other hand, in step S1608, it is determined whether the previous mode is the MF mode, and if the MF mode, the process proceeds to step S1609; otherwise, the process proceeds to step S1607.

In step S1609, the defocus amounts of all the focus detection areas 401 (9×9) in the AF frame 400 is acquired, and in step S1610, the focus detection areas within the in-focus range out of all the focus detection areas 401 are detected. In step S1611, it is determined whether or not there are the predetermined number or more of adjacent focus detection areas within the in-focus range. This is a process of verifying the likelihood of the subject. Here, as an example, the predetermined number is 2 or more. If there are the predetermined number or more of adjacent focus detection areas within the in-focus range, the process proceeds to step S1614, and if not, the process proceeds to step S1612.

In step S1612, from the focus detection results of all the focus detection areas 401, focus detection areas within a predetermined depth of focus from the current focus position are detected. Here, as an example, the predetermined depth of focus is three depths. This process is for the main subject which is no longer in the focused state at the time of switching the mode, as the main subject has moved. Then, in step S1613, it is determined whether or not there are a predetermined number or more of adjacent focus detection areas within three depths. Here, as an example, the predetermined number is 2 or more. If there are the predetermined number or more of adjacent focus detection areas within three depths, the process proceeds to step S1614, otherwise, the process proceeds to step S1607.

In step S1614, a focus detection frame (3×3 focus detection areas) centered on the center of the predetermined number or more of the adjacent focus detection areas within the in-focus range or within three depths is set, and the processing is terminated.

It should be noted that in the second embodiment, the focus detection frame is set to the 3×3 focus detection areas, and this is because the focus detection frame is set to have the same size as the priority frame 1201. The size of the focus detection frame may be changed according to the size of the priority frame.

According to the second embodiment as described above, even in a case where a state in which the main subject located at a position other than the center of the screen in the face detection mode, the manual focus mode, or the like, is switched to the center-weighted AF method, for example, it becomes possible to keep capturing the subject.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-151034, filed on Aug. 3, 2017 which is hereby incorporated by reference herein in its entirety.

What is claimed is:

1. A focus control apparatus comprising:
   a memory device configured to store a set of instructions;
   at least one processor configured to execute the set of instructions to function as:
   a focus signal processing unit that detects focus states of a predetermined first area and a predetermined second area arranged about a periphery of the predetermined first area, using a pair of focus detection signals having parallax based on signals output from an image sensor; and
   a control unit that controls to perform focus control based on the focus states detected by the focus signal processing unit,
   wherein the control unit controls so as to
      perform the focus control based on the focus state of the predetermined first area in a case where the focus state of the predetermined first area is within a predetermined first range,
      perform the focus control based on the locus state of the predetermined second area in a case where the focus state of the predetermined first area is not within the first range and the focus state of the predetermined second area is within a predetermined second range and,
      perform the focus control based on the focus state of the predetermined first area in a case where it is determined that a subject exists on a near side based on the focus state of the predetermined first area even if the focus state of the predetermined first area is not within the first range and the focus state of the predetermined second area is within the second range.

2. The focus control apparatus according to claim 1, wherein the focus signal processing unit divides the predetermined first area into a plurality of focus detection areas, obtains a defocus amount for each of the focus detection areas using the phase difference between the pair of focus detection signals, and in a case where a number of focus detection areas having the defocus amount indicating a near side by a predetermined third range or more is larger than a predetermined number, determines that a subject exists on the near side.

3. The focus control apparatus according to claim 2, wherein the third range is determined based on a depth of focus.

4. The focus control apparatus according to claim 1, wherein, in a case where the control unit controls to perform focus control based on the focus state of the predetermined second area, the focus signal processing unit acquires defocus amounts for the predetermined first area and the predetermined second area using the phase differences between the pair of focus detection signals, and in a case where the defocus amount of the predetermined first area indicates a nearer side than the defocus amount of the predetermined second area, determines that a subject exists on a near side.

5. The focus control apparatus according to claim 4, wherein, in a case where the defocus amount of the predetermined first area indicates a nearer side than the defocus amount of the predetermined second area by a predetermined depth of focus, the focus signal processing unit determines that the subject exists on the near side.

6. The focus control apparatus according to claim 1, wherein the focus signal processing unit divides the predetermined first area into a plurality of focus detection areas, obtains a defocus amount for each of the focus detection areas using the phase difference between the pair of focus detection signals, and in a case where a number of focus detection areas having the defocus amounts within the first range is equal to or greater than a first threshold value, performs focus detection using the defocus amounts of the focus detection areas in the predetermined first area having the defocus amounts within the first range.

7. The focus control apparatus according to claim 6, wherein, in a case where the number of focus detection areas in the predetermined first area having defocus amounts within the first range is less than the first threshold value, the focus signal processing unit divides the predetermined second area into a plurality of focus detection areas, obtains a defocus amount for each of the focus detection areas of the predetermined second area using a phase difference between the pair of focus detection signals, and in a case where the number of the focus detection areas in the predetermined second area having defocus amounts within the second range is equal to or greater than a second threshold value, performs focus detection using the defocus amounts of the focus detection areas in the predetermined second area having the defocus amounts within the second range.

8. The focus control apparatus according to claim 7, wherein in a case where the number of focus detection areas in the predetermined second area having defocus amounts within the second range is less than the second threshold value, the focus signal processing units divides a third area including the first and predetermined second areas into a plurality of focus detection areas, obtains a defocus amount for each of the focus detection areas in the third area using a phase difference between the pair of focus detection signals, and performs focus detection using the defocus amounts of the focus detection areas in the third area having the defocus amounts within a predetermined fourth range.

9. The focus control apparatus according to claim 8, wherein in a case where a number of focus detection areas in the third area having defocus amounts within the fourth range is less than a third threshold value, the focus signal processing units determines that focus detection has failed.

10. The focus control apparatus according to claim 6, wherein the processor further executes a set of instructions to function as a first setting unit that detects a predetermined subject and sets the predetermined first area at a position of an area of the detected subject.

11. The focus control apparatus according to claim 10, wherein, in a case where a state in which the subject is detected is changed to a state in which the subject is not detected and a number of focus detection areas in the predetermined first area having defocus amounts within the first range is less than the first threshold value, the first setting unit changes the predetermined first area to a predetermined area.

12. The focus control apparatus according to claim 6, wherein the processor further executes a set of instructions to function as a second setting unit that sets the predetermined first area after moving a focus lens in accordance with a manual focus operation.

13. The focus control apparatus according to claim 12, wherein, in a case where the manual focus operation is terminated, the second setting unit divides a third area including the first and second areas into a plurality of focus detection areas, obtains a defocus amount for each of the focus detection areas in the third area using a phase difference between the pair of focus detection signals, and in a case where any of the focus detection areas in the third area satisfies a predetermined condition, the focus signal processing unit performs the focus detection using defocus amounts of the focus detection areas in the third area that satisfy the predetermined condition.

14. The focus control apparatus according to claim 13, wherein, in a case where no focus detection area in the third area satisfies the condition, the second setting unit sets the predetermined first area to a predetermined area.

15. The focus control apparatus according to claim 13, wherein the condition is that a predetermined number or more of the focus detection areas in the third area having defocus amounts less than a fourth range are adjacent to each other.

16. The focus control apparatus according to claim 1, wherein the first range and the second range are determined based on a depth of focus.

17. A focus control method comprising:
   detecting a focus state of a predetermined first area and a predetermined second area, arranged about a periphery of the predetermined first area, using a pair of focus detection signals having parallax based on signals output from an image sensor; and
   controlling to
      perform the focus control based on the focus state of the predetermined first area in a case where the focus state of the predetermined first area is within a predetermined first range,
      perform focus control based on the focus state of the predetermined second area in a case where the focus state of the predetermined first area is not within the first range and the focus state of the predetermined second area is within a predetermined second range; and
      perform the focus control based on the focus state of the predetermined first area in a case where it is determined that a subject exists on a near side based on the focus state of the predetermined first area even if the focus state of the predetermined first area is not within the first range and the focus state of the predetermined second area is within the second range.

18. A non-transitory storage medium readable by a computer, the storage medium storing a program that is executable by the data processing apparatus, wherein the program includes program code for causing the data processing apparatus to perform as a focus control apparatus comprising:
   a focus signal processing unit that detects focus states of a predetermined first area and a predetermined second area arranged about a periphery of the predetermined first area, using a pair of focus detection signals having parallax based on signals output from an image sensor; and
   a control unit that controls to perform focus control based on the focus states detected by the focus signal processing unit,
   wherein the control unit controls so as to
      perform the focus control based on the focus state of the predetermined first area in a case where the focus state of the predetermined first area is within a predetermined first range,
      perform the focus control based on the focus state of the predetermined second area in a case where the focus state of the predetermined first area is not within the first range and the focus state of the predetermined second area is within a predetermined second range and,
      perform the focus control based on the focus state of the predetermined first area in a case where it is determined that a subject exists on a near side based on the focus state of the predetermined first area even if the focus state of the predetermined first area is not within the first range and, the focus state of the predetermined second area is within the second range.

* * * * *